(12) United States Patent
Ibrahim et al.

(10) Patent No.: US 12,445,885 B2
(45) Date of Patent: Oct. 14, 2025

(54) CHANNEL STATE INFORMATION REFERENCE SIGNAL ESTIMATION GRANULARITY CONFIGURATION IN FULL-DUPLEX

(71) Applicant: QUALCOMM Incorporated, San Diego, CA (US)

(72) Inventors: Abdelrahman Mohamed Ahmed Mohamed Ibrahim, San Diego, CA (US); Muhammad Sayed Khairy Abdelghaffar, San Jose, CA (US); Ahmed Attia Abotabl, San Diego, CA (US); Qian Zhang, Basking Ridge, NJ (US); Ahmed Elshafie, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 395 days.

(21) Appl. No.: 17/821,137

(22) Filed: Aug. 19, 2022

(65) Prior Publication Data
US 2024/0064548 A1 Feb. 22, 2024

(51) Int. Cl.
*H04W 24/10* (2009.01)
*H04L 25/02* (2006.01)
*H04L 5/14* (2006.01)

(52) U.S. Cl.
CPC ......... *H04W 24/10* (2013.01); *H04L 25/0202* (2013.01); *H04L 5/14* (2013.01)

(58) Field of Classification Search
CPC ... H04B 7/0617; H04L 5/0051; H04L 5/0057; H04L 5/0092; H04L 5/14; H04W 24/10; H04W 72/02; H04W 72/04
USPC ........................................ 370/252, 278, 329
See application file for complete search history.

(56) References Cited

U.S. PATENT DOCUMENTS

| | | | |
|---|---|---|---|
| 2020/0120640 A1* | 4/2020 | Liu | H04W 72/02 |
| 2021/0203388 A1* | 7/2021 | Tomeba | H04W 24/10 |

FOREIGN PATENT DOCUMENTS

WO WO-2024026641 A1 * 2/2024

* cited by examiner

*Primary Examiner* — Harun Chowdhury
(74) *Attorney, Agent, or Firm* — Guang Y. Zhang; Harrity & Harrity, LLP

(57) ABSTRACT

Various aspects of the present disclosure generally relate to wireless communication. In some aspects, a network node may transmit a channel estimation granularity indication that specifies a channel estimation granularity associated with generating channel state information (CSI) that is based at least in part on a full-duplex configuration. The network node may receive the CSI associated with the channel estimation granularity indication. Numerous other aspects are described.

30 Claims, 12 Drawing Sheets

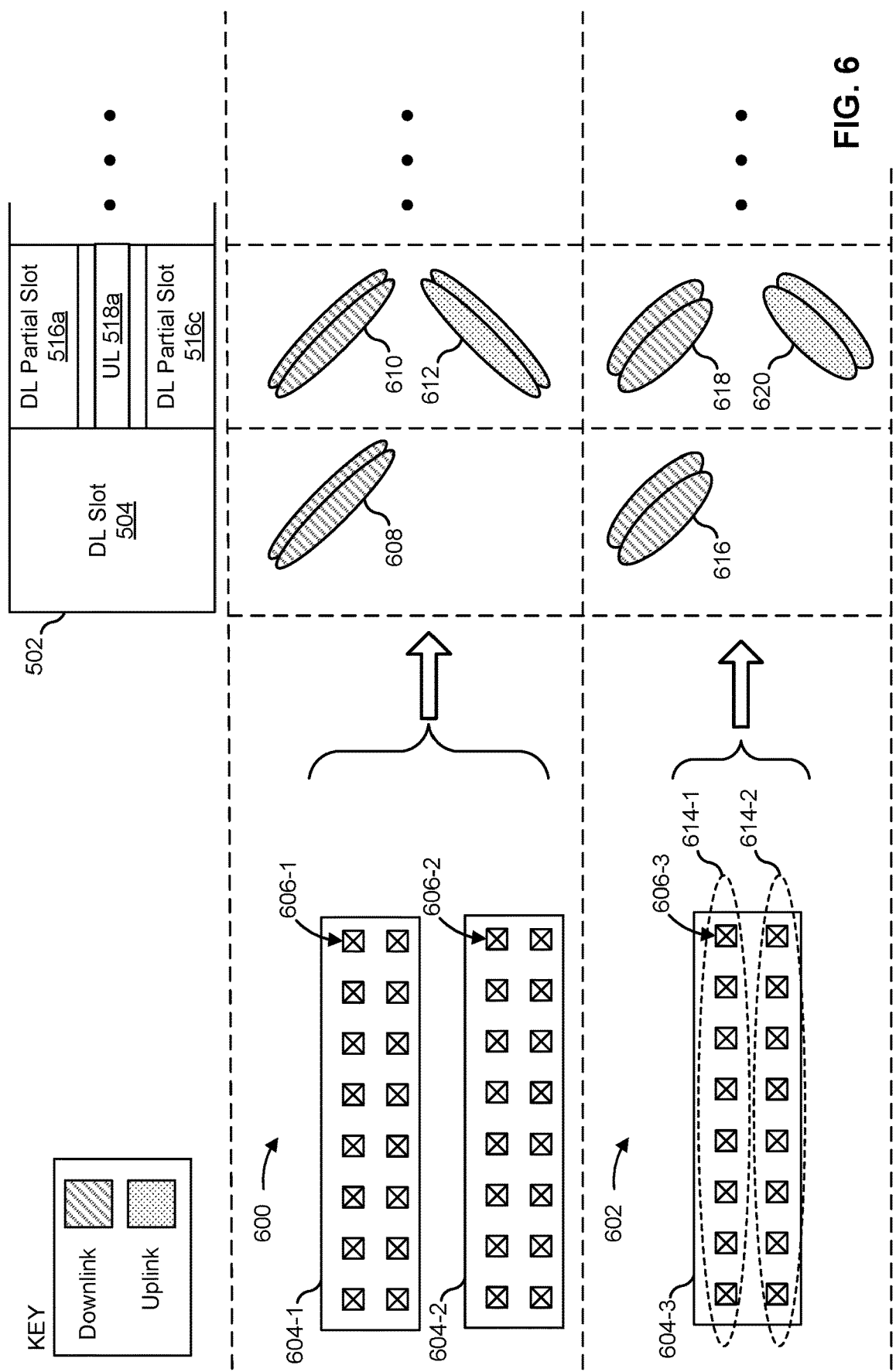

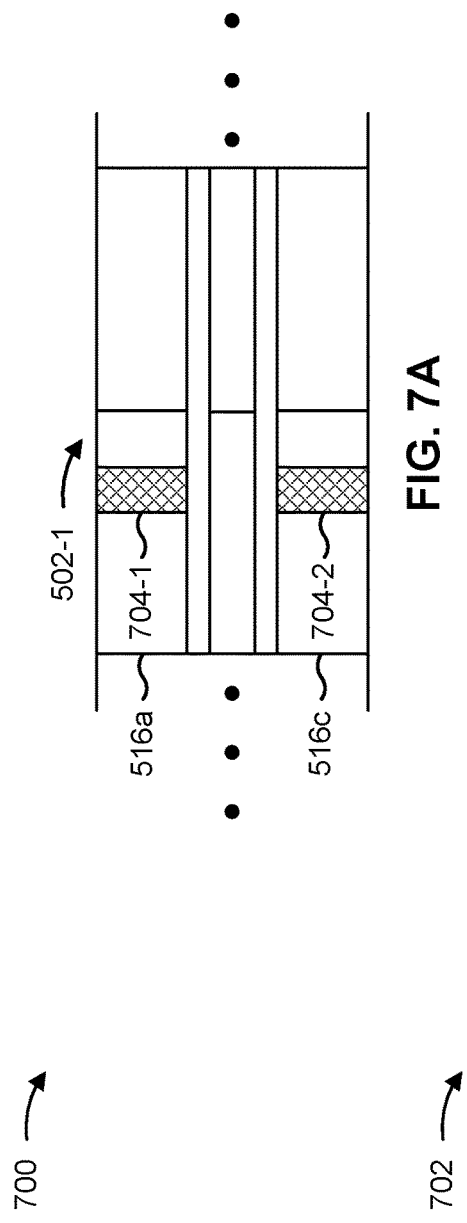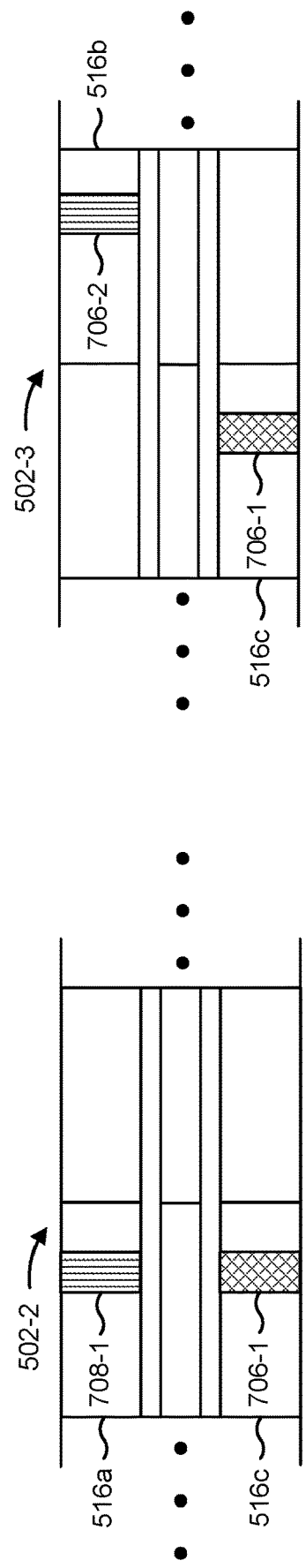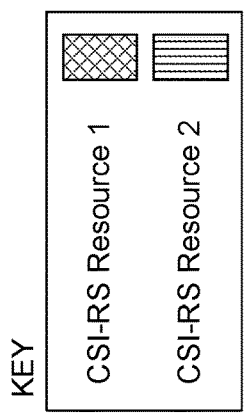
FIG. 7A
FIG. 7B

CHANNEL STATE INFORMATION REFERENCE SIGNAL ESTIMATION GRANULARITY CONFIGURATION IN FULL-DUPLEX

FIELD OF THE DISCLOSURE

Aspects of the present disclosure generally relate to wireless communication and to techniques and apparatuses for channel state information reference signal channel estimation granularity configuration in full-duplex.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to an apparatus for wireless communication at a network node. The apparatus may include a memory and one or more processors coupled to the memory. The one or more processors may be configured to transmit a channel estimation granularity indication that specifies a channel estimation granularity associated with generating channel state information (CSI) that is based at least in part on a full-duplex configuration. The one or more processors may be configured to receive the CSI associated with the channel estimation granularity indication.

Some aspects described herein relate to an apparatus for wireless communication user equipment (UE). The apparatus may include a memory and one or more processors coupled to the memory. The one or more processors may be configured to receive a channel estimation granularity indication that is associated with generating CSI that is based at least in part on a full-duplex configuration. The one or more processors may be configured to transmit the CSI that is based at least in part on the channel estimation granularity indication.

Some aspects described herein relate to a method of wireless communication performed by a network node. The method may include transmitting a channel estimation granularity indication that specifies a channel estimation granularity associated with generating CSI that is based at least in part on a full-duplex configuration. The method may include receiving the CSI associated with the channel estimation granularity indication.

Some aspects described herein relate to a method of wireless communication performed by a UE. The method may include receiving a channel estimation granularity indication that is associated with generating CSI that is based at least in part on a full-duplex configuration. The method may include transmitting the CSI that is based at least in part on the channel estimation granularity indication.

Some aspects described herein relate to a non-transitory computer-readable medium that stores a set of instructions for wireless communication by a network node. The set of instructions, when executed by one or more processors of the network node, may cause the network node to transmit a channel estimation granularity indication that specifies a channel estimation granularity associated with generating CSI that is based at least in part on a full-duplex configuration. The set of instructions, when executed by one or more processors of the network node, may cause the network node to receive the CSI associated with the channel estimation granularity indication.

Some aspects described herein relate to a non-transitory computer-readable medium that stores a set of instructions for wireless communication by a UE. The set of instructions, when executed by one or more processors of the UE, may cause the UE to receive a channel estimation granularity indication that is associated with generating CSI that is based at least in part on a full-duplex configuration. The set of instructions, when executed by one or more processors of the UE, may cause the UE to transmit the CSI that is based at least in part on the channel estimation granularity indication.

Some aspects described herein relate to an apparatus for wireless communication. The apparatus may include means for transmitting a channel estimation granularity indication that specifies a channel estimation granularity associated with generating CSI that is based at least in part on a full-duplex configuration. The apparatus may include means for receiving the CSI associated with the channel estimation granularity indication.

Some aspects described herein relate to an apparatus for wireless communication. The apparatus may include means for receiving a channel estimation granularity indication that is associated with generating CSI that is based at least in part on a full-duplex configuration. The apparatus may include means for transmitting the CSI that is based at least in part on the channel estimation granularity indication.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 6 is a diagram illustrating a first example of a first antenna configuration and a second example of a second antenna configuration that may be used for SBFD transmissions, in accordance with the present disclosure.

FIGS. 7A and 7B are diagrams illustrating a first example and a second example of configuring one or more channel state information reference signal (CSI-RS) resources based at least in part on non-contiguous resources, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
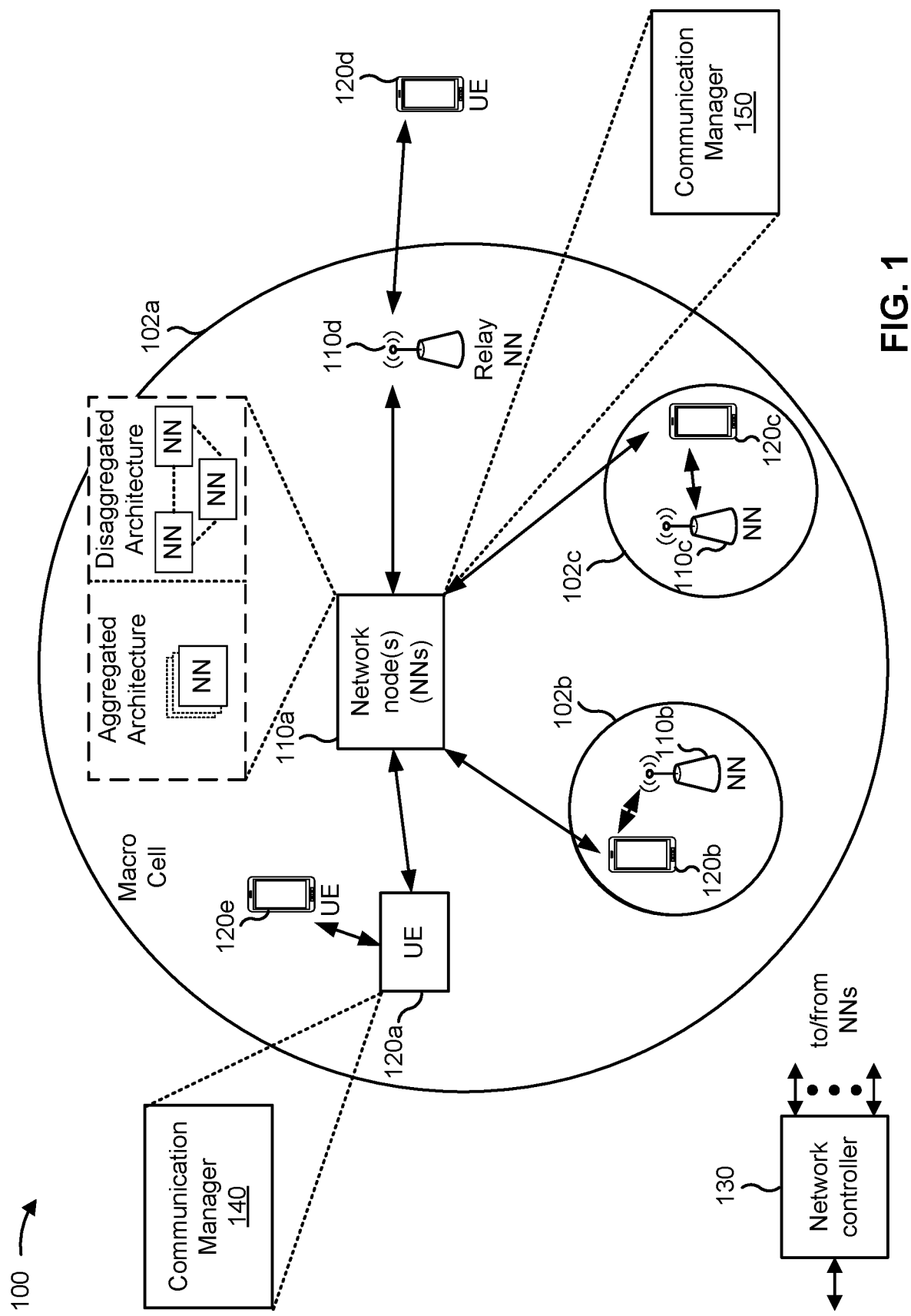
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the term "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the term "base station" or "network node" may refer to one device configured to perform one or more functions, such as those described herein in connection with the network node 110. In some aspects, the term "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the term "base station" or "network node" may refer to any one or more of those different devices. In some aspects, the term "base station" or "network node" may refer to one or more virtual base stations or one or more virtual base station functions. For example, in some aspects, two or more base station functions may be instantiated on a single device. In some aspects, the term "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the network node may include a communication manager 150. As described in more detail elsewhere herein, the communication manager 150 may transmit a channel estimation granularity indication that specifies a channel estimation granularity associated with generating channel state information (CSI) that is based at least in part on a full-duplex configuration; and receive the CSI associated with the channel estimation granularity indication. Additionally, or alternatively, the communication manager 150 may perform one or more other operations described herein.

In some aspects, the UE 120 may include a communication manager 140. As described in more detail elsewhere herein, the communication manager 140 may receive a channel estimation granularity indication that is associated with generating CSI that is based at least in part on a full-duplex configuration; and transmit the CSI that is based at least in part on the channel estimation granularity indication. Additionally, or alternatively, the communication manager 140 may perform one or more other operations described herein.

As indicated above, FIG. 1 is provided as an example. Other examples may differ from what is described with regard to FIG. 1.

Figure 2:
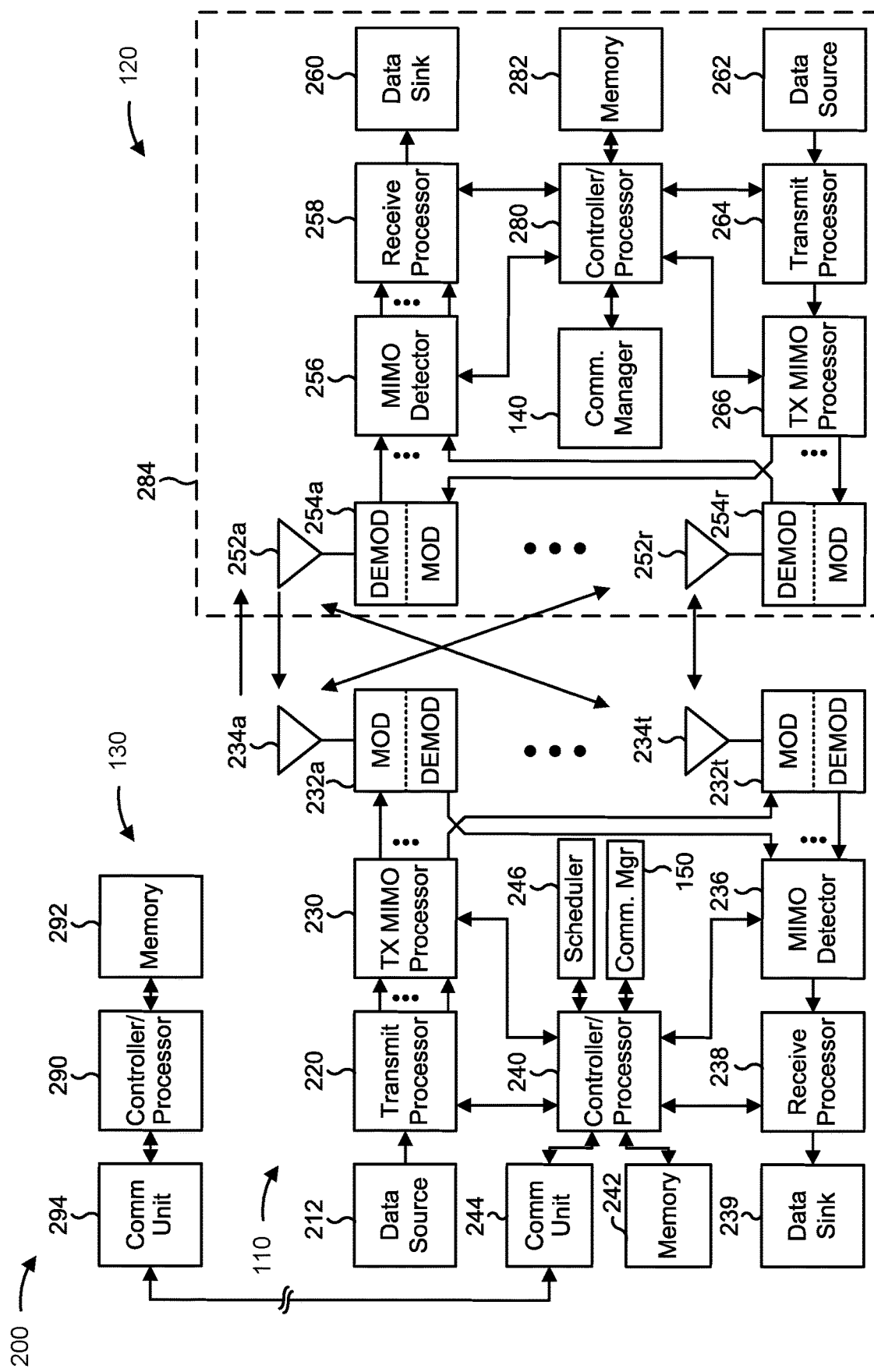
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 7-12).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 7-12).

The controller/processor 240 of the network node 110, the controller/processor 280 of the UE 120, and/or any other component(s) of FIG. 2 may perform one or more techniques associated with channel state information reference signal channel estimation granularity configuration in full-duplex, as described in more detail elsewhere herein. For example, the controller/processor 240 of the network node 110, the controller/processor 280 of the UE 120, and/or any other component(s) of FIG. 2 may perform or direct operations of, for example, process 900 of FIG. 9, process 1000 of FIG. 10, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 900 of FIG. 9, process 1000 of FIG. 10, and/or other processes as described herein. In some examples, executing instructions may include running the instructions, converting the instructions, compiling the instructions, and/or interpreting the instructions, among other examples.

In some aspects, a network node (e.g., the network node 110) includes means for transmitting a channel estimation granularity indication that specifies a channel estimation granularity associated with generating CSI that is based at least in part on a full-duplex configuration; and/or means for receiving the CSI associated with the channel estimation granularity indication. In some aspects, the means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, a UE (e.g., the UE 120) includes means for receiving a channel estimation granularity indication that is associated with generating CSI that is based at least in part on a full-duplex configuration; and/or means for transmitting the CSI that is based at least in part on the channel estimation granularity indication. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
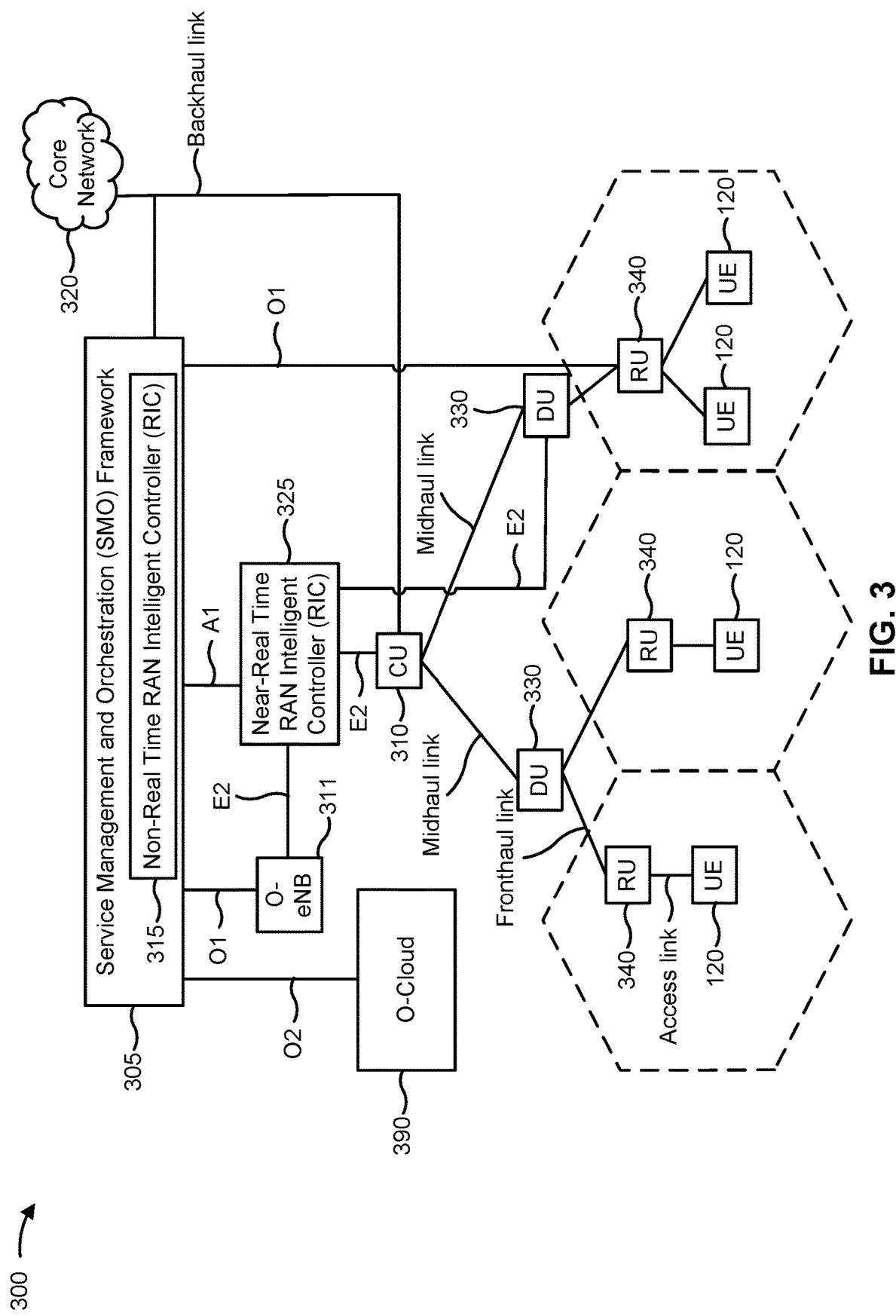
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a MAC layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
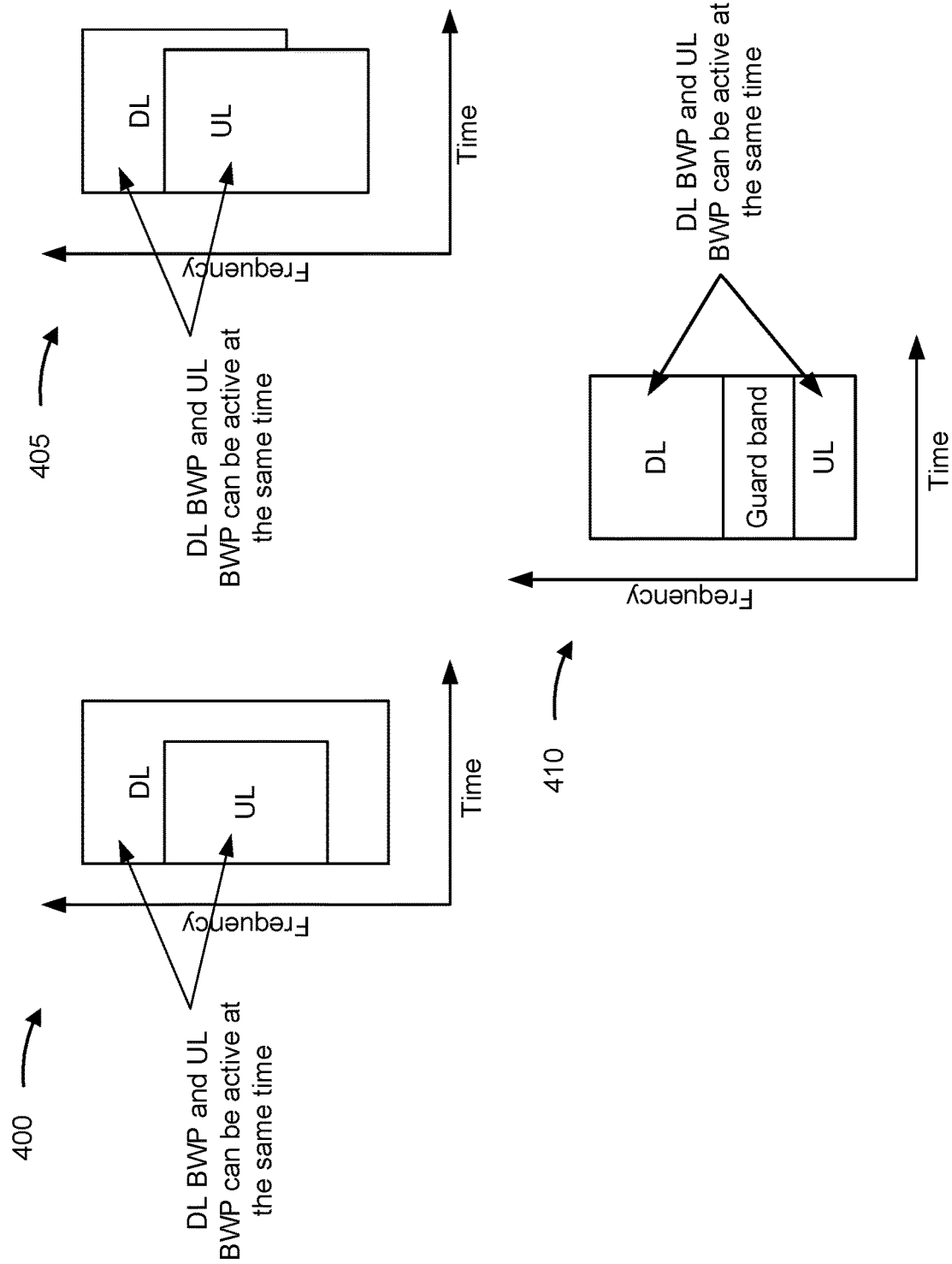
FIG. 4 is a diagram illustrating a first example, a second example, and a third example of full-duplex communication in a wireless network, in accordance with the present disclosure.

FIG. 4 is a diagram illustrating a first example 400, a second example 405, and a third example 410 of full-duplex communication in a wireless network, in accordance with the present disclosure. "Full-duplex communication" in a wireless network refers to simultaneous bi-directional communication between devices in the wireless network. For example, a UE operating in a full-duplex mode may transmit an uplink communication and receive a downlink (DL) communication at the same time (e.g., in the same slot or the same symbol). "Half-duplex communication" in a wireless network refers to unidirectional communications (e.g., only downlink communication or only uplink communication) between devices at a given time (e.g., in a given slot or a given symbol).

As shown in FIG. 4, the first example 400 and the second example 405 show examples of in-band full-duplex (IBFD) communication. In IBFD, a UE may transmit an uplink communication to a network node and receive a downlink communication from the network node on the same time and frequency resources. As shown in the first example 400 of IBFD, the time and frequency resources for uplink communication may fully overlap with the time and frequency resources for downlink communication. As shown in the second example 405 of IBFD, the time and frequency resources for uplink communication may partially overlap with the time and frequency resources for downlink communication.

As further shown in FIG. 4, the third example 410 shows an example of sub-band full-duplex (SBFD) communication, which may also be referred to as "sub-band frequency division duplex (SBFDD)" or "flexible duplex." In SBFD, a UE may transmit an uplink communication to a network node and receive a downlink communication from the network node at the same time, but on different frequency resources. For example, the different frequency resources may be sub-bands of a frequency band, such as a time division duplexing band. In this case, the frequency resources used for downlink communication may be separated from the frequency resources used for uplink communication, in the frequency domain, by a guard band.

As indicated above, FIG. 4 is provided as an example. Other examples may differ from what is described with respect to FIG. 4.

Figure 5:
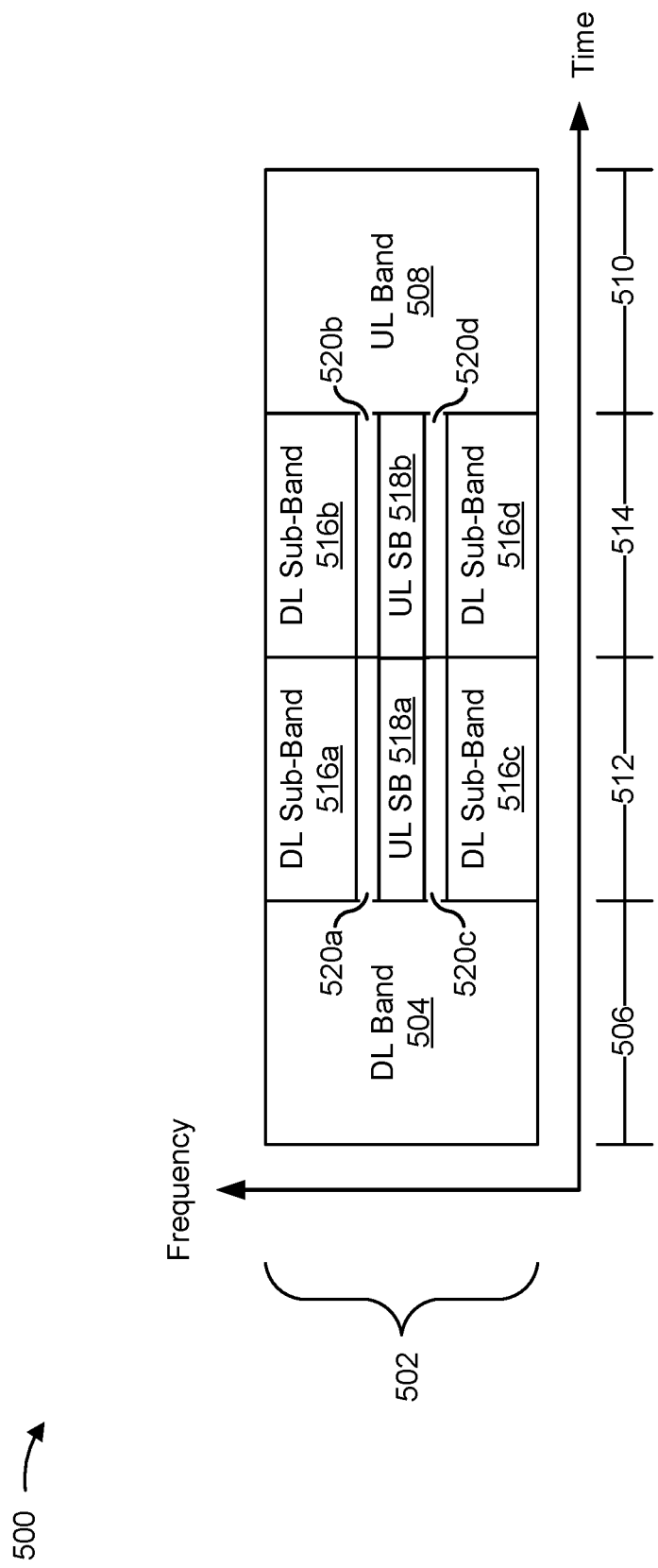
FIG. 5 is a diagram illustrating an example of a sub-band full-duplex (SBFD) format, in accordance with the present disclosure.

FIG. 5 is a diagram illustrating an example 500 of a sub-band full-duplex (SBFD) format 502, in accordance with the present disclosure. As shown by the example 500, the SBFD format 502 may specify a slot format pattern that is based at least in part on one or more time partitions (e.g., shown on a horizontal axis) in combination with one or more frequency partitions (e.g., shown on a vertical axis). To illustrate, each time partition may correspond to a time slot (e.g., "slot") and each frequency partition may correspond to a full frequency band and/or a frequency sub-band. The slot format pattern may include any combination of one or more full band slots, one or more sub-band slots, and/or one or more guard bands. In some aspects, a network node (e.g., the network node 110) and a UE (e.g., the UE 120) may communicate with one another based at least in part on the SBFD format 502 to transmit and/or receive wireless signals.

As one example, and as shown by the SBFD format 502, an SBFD format may include a full downlink band 504 (DL band 504) positioned at a start of the slot format pattern at time duration 506 (e.g., a first slot) and a full uplink band 508 (UL band 508) positioned at an end of the slot format pattern at time duration 510 (a second slot). Other examples may position a full DL band and/or a full UL band at different time durations. At time duration 512 (e.g., a third slot) and time duration 514 (e.g., a fourth slot), the SBFD format 502 partitions the full band into one or more partial and/or sub-bands (e.g., a sub-band of a full frequency band associated with the SBFD format). The SBFD format 502 may partition the sub-bands into a same size or in varying sizes. A size of a sub-band may be based at least in part on one or more resource blocks (RB). Some aspects may limit a number of sub-bands that may be included in a bandwidth and/or a bandwidth part. As one example, a communication standard may limit a number of sub-bands to N to reduce an amount of total communication associated with reporting measurements for each sub-band, where N is an integer.

As shown by the example 500, the SBFD format 502 may specify one or more sub-bands of a same or different size to one or more downlink communications. To illustrate, the SBFD format 502 designates downlink sub-band 516a (DL sub-band 516a), downlink sub-band 516b (DL sub-band 516b), downlink sub-band 516c (DL sub-band 516c), and downlink sub-band 516d (DL sub-band 516d) to downlink communication(s). An SBFD format may also designate one or more sub-bands to one or more uplink communications, shown by the SBFD format 502 as uplink sub-band 518a (UL sub-band 518a) and uplink sub-band 518b (UL sub-band 518b). Alternatively or additionally, an SBFD format may specify one or more guard bands between a DL sub-band and a UL sub-band, such as guard band 520a, guard band 520b, guard band 520c, and/or guard band 520d as shown by the SBFD format 502.

In some aspects, the SBFD format 502 may repeat over time. For example, at the expiration of the time duration 510, the SBFD format 502 may repeat as shown by the time duration 506 (e.g., the DL band 504), the time duration 512 (e.g., the DL sub-band 516a, the DL sub-band 516c, the UL sub-band 518a, the guard band 520a, and the guard band 520c), the time duration 514 (e.g., the DL sub-band 516b, the DL sub-band 516d, the UL sub-band 518b, the guard band 520b, and the guard band 520d), and the time duration 510 (e.g., the UL band 508). Repeating the SBFD format 502 may denote that a network node (e.g., the network node 110) and a UE (e.g., the UE 120) may repeat communicating with one another based at least in part on the (repeated) SBFD format 502.

The slot format pattern shown by the SBFD format 502 may vary in other examples. As one example, the full band shown at the time duration 506 (e.g., the DL band 504) and/or at the time duration 510 (e.g., the UL band 508) may be replaced with a UL sub-band, a DL sub-band, and/or guard bands. Alternatively or additionally, the sub-bands and/or guard bands shown by the time duration 512 and/or the time duration 514 may be replaced by a full band. In some aspects, the sub-bands and/or guard bands shown by the time duration 512 and/or the time duration 514 may be replaced with a sub-band and/or a guard band that has a different size.

As indicated above, FIG. 5 is provided as an example. Other examples may differ from what is described with respect to FIG. 5.

FIG. 6 is a diagram illustrating a first example 600 of a first antenna configuration and a second example 602 of a second antenna configuration that may be used for SBFD transmissions, in accordance with the present disclosure.

An antenna panel may include multiple antenna elements configured to transmit and/or receive beamformed wireless signals (e.g., as part of a phased array). To illustrate, multiple antenna elements may each transmit a same signal using varying phase shifts to control a radiation pattern, such as phase shifts that cause signal variations to constructively and/or destructively form into a beam. Different factors may influence the characteristics of a beam. As one example, using more antenna elements to form a first beam may result in a beam with a more narrow spatial width relative to a second beam that is formed using fewer antenna elements. As another example, a first beam that spans a wider range of frequencies relative to a second beam (e.g., with a same beam configuration) may have a higher power spectral density relative to the second beam.

In some aspects, a network node and/or a UE may include multiple antenna panels for transmitting and/or receiving a wireless communication. To illustrate, a UE may include multiple antenna panels positioned at different edges of the UE to improve a spherical coverage area of transmitting and/or receiving (directional) beams and/or to mitigate signal blockage by switching from using a first antenna panel to a second antenna panel. Alternatively or additionally, a network node may include multiple antenna panels at different locations to enable the network node to switch between antenna panels (and transmission/reception locations) to improve a signal quality associated with transmitting a beam to (and/or receiving a beam from) a UE that is changing locations. An antenna panel may be configured as a directional antenna (e.g., transmission only or reception only) or as a bidirectional antenna (e.g., partitioning antenna elements into directional subarrays of antenna elements). In some aspects, an antenna panel may be dynamically configured at a device. To illustrate, a device may initially use an antenna panel as a (directional) transmission antenna panel for a first time duration and then dynamically reconfigure the antenna panel to a (directional) reception antenna panel for a second time duration.

The example 600 includes a first antenna panel 604-1 and a second antenna panel 604-2. In some aspects, each antenna panel may include multiple antenna elements. For instance, and as shown by reference number 606-1, the first antenna panel 604-1 may include a first set of antenna elements (e.g., m antenna elements, where m is an integer). Alternatively or additionally, and as shown by reference number 606-2, the second antenna panel 604-2 may include a second set of antenna elements (e.g., n antenna elements, where n is an integer). While the example 600 shows antenna panels in which m=n, other examples may include antenna panels that include a different number of antenna elements from one another.

As shown by the example 600, the first antenna panel 604-1 may be configured as a first directional antenna array that performs transmission and the second antenna panel 604-2 may be configured as a second directional antenna array that performs reception. As one example, the first antenna panel 604-1 and the second antenna panel 604-2 may be included in a network node (e.g., the network node 110). In other examples, the first (directional) antenna panel 604-1 and/or the second (directional) antenna panel 604-2 may be included in a UE (e.g., the UE 120). In some aspects, the network node may use the first antenna panel 604-1 to transmit a downlink communication to a UE and the second antenna panel 604-2 to receive an uplink communication with the UE. To illustrate, the network node may communicate with the UE using the first and second antenna panels based at least in part on an SBFD format, such as the SBFD format 502 as described with regard to FIG. 5 (shown partially in FIG. 6 for visual brevity).

During a first time duration associated with the DL band 504, the network node may transmit a first downlink beam 608 based at least in part on using the first antenna panel 604-1. In some aspects, and based at least in part on the SBFD format 502, the network node may transmit the first downlink beam 608 as a full band downlink transmission that has a first power of P decibel-milliwatt (dBm).

During a second time duration associated with the DL sub-band 516a, the DL sub-band 516c, and the UL sub-band 518a, the network node may transmit a second downlink beam 610 based at least in part on using the first antenna panel 604-1 and may receive an uplink beam 612 based at least in part on using the second antenna panel 604-2. In some aspects, the network node may transmit the second downlink beam 610 as a partial and/or sub-band transmission as specified by the SBFD format 502. The second downlink beam 610 may have commensurate (e.g., within a same range and/or within a same threshold value) beam characteristics as the first downlink beam 608 based at least in part on the network node using the same antenna panel and/or same antenna array. However, the second downlink beam 610 may have a reduced power spectral density relative to the first downlink beam 608. As one example, the second downlink beam 610 may have less than P dBm based at least in part on using a reduced total number of transmitting antennas.

As shown by the example 602, a network node (e.g., the network node 110) and/or a UE (e.g., the UE 120) may partition a single antenna panel (e.g., a third antenna panel 604-3) into multiple antenna subarrays. To illustrate, and as shown by reference number 606-3, the third antenna panel 604-3 may include a third set of antenna elements. In some aspects, the network node and/or the UE may partition a first subset of the antenna elements into a first antenna subarray 614-1 and a second subset of the antenna elements into a second antenna subarray 614-2. With regard to the SBFD format 502, the network node may configure the first antenna subarray 614-1 to transmit a downlink communication to a UE and the second antenna subarray 614-2 to receive an uplink communication from the UE.

During a first time duration associated with the DL band 504, the network node may transmit a first downlink beam 616 based at least in part on using the first antenna subarray

614-1. Relative to the first downlink beam 606 as shown by the example 600, the first downlink beam 616 may have a wider spatial width based at least in part on the first antenna subarray 614-1 having fewer antenna elements relative to the first antenna panel 604-1. To illustrate, if the first antenna panel 604-1 and the third antenna panel 604-3 each include m antenna elements, partitioning the antenna elements of the third antenna panel 604-3 into antenna subarrays may result in the network node using fewer antenna elements for the transmission of the first downlink beam 616 relative to the first downlink beam 608. Using fewer antenna elements may result in a beam with a spatial width that is wider relative to another beam transmitted with more antenna elements.

During a second time duration associated with the DL sub-band 516a, the DL sub-band 516c, and the UL sub-band 518a, the network node may transmit a second downlink beam 618 based at least in part on using the first antenna array 614-1 and may receive an uplink beam 620 based at least in part on using the second antenna array 614-2. The second downlink beam 618 may have commensurate beam characteristics but a reduced power relative to the first downlink beam 616.

As a device changes antenna configurations, such as by changing from using a first antenna panel for transmission to a second panel for transmission and/or reconfiguring which antenna elements are included in a subarray, the characteristics of a beam transmitted and/or received by the device may vary as well. In some aspects, changing antenna configurations may alternatively or additionally change a transmission channel characteristic associated with transmitting and/or receiving the beam. To illustrate, changing from transmitting and/or receiving based at least in part on a first antenna panel at a first location to a second antenna panel at a second location may modify a propagation path associated with the beam, modify an obstruction encountered by the beam, and/or change a multipath environment. Accordingly, beam characteristics and/or signal properties associated with the beam may be based at least in part on an antenna configuration used to transmit and/or receive the beam.

As indicated above, FIG. 6 is provided as an example. Other examples may differ from what is described with regard to FIG. 6.

FIGS. 7A and 7B are diagrams illustrating a first example 700 and a second example 702 of configuring one or more channel state information reference signal (CSI-RS) resources based at least in part on non-contiguous resources, in accordance with the present disclosure.

A network node may transmit CSI-RS for various purposes. As one example, the network node may transmit CSI-RS and instruct a UE to generate any combination of a channel measurement, an interference measurement, and/or CSI feedback (e.g., a precoding matrix indicator (PMI), a rank indicator (RI), and/or CQI). Based at least in part on the channel measurement, the interference measurement, and/or the CSI feedback, the network node may select a transmission configuration (e.g., a modulation scheme, a code rate, a number of transmission layers, and/or MIMO precoding) that may improve a signal quality of a downlink transmission relative to other transmission configurations.

In some aspects, the network node may indicate CSI-RS resource information that specifies a CSI-RS resource configuration. The CSI-RS resource information may indicate one or multiple CSI-RS resource configurations (CSI-RS-resourceConfig), where each CSI-RS resource configuration specifies characteristic(s) about a CSI-RS. As one example, the CSI-RS resource configuration may specify a type of reference signal that will be transmitted and/or measured, such as a non-zero power CSI-RS (NZP-CSI-RS) and/or a CSI interference measurement resource (CSI-IM-Resource). As another example, a CSI-RS resource configuration may indicate a transmission type associated with the reference signal (e.g., periodic, aperiodic, semipersistent) and/or a set of resources associated with the reference signal.

Alternatively or additionally, the network node may specify a CSI-RS report configuration (CSI-RS-reportConfig) that indicates a CSI reporting configuration to use for generating and transmitting CSI feedback. As one example, the CSI-RS report configuration may indicate a particular CSI-RS resource configuration (e.g., of multiple CSI-RS resource configurations) to use for a measurement. In some aspects, the CSI-RS report configuration may indicate a periodicity for generating and transmitting CSI feedback and/or a report frequency configuration (e.g., a wideband configuration or a sub-band configuration).

In some aspects, a network node may alternate antenna configurations when transmitting CSI-RS that is based at least in part on an SBFD format and/or non-contiguous resources. Without receiving an indication of an antenna configuration change, a UE may generate erroneous CSI feedback.

To illustrate, the first example 700 includes a first SBFD format 502-1 that may be a first instance of the SBFD format 502 as described with regard to FIG. 5 (shown partially in FIG. 7A for visual brevity). In some aspects, a network node may indicate, by way of a single CSI-RS resource configuration, a configuration of a single, non-contiguous CSI-RS resource that spans multiple partial DL sub-bands of the SBFD format 502-1. To illustrate, the single CSI-RS resource may include a first portion 704-1 that is based at least in part on one or more resources of the DL sub-band 516a and a second portion 704-2 that is based at least in part on one or more resources of the DL sub-band 516c. As shown by the first example 700, the first portion 704-1 and the second portion 704-2 are based at least in part on non-contiguous resources. For example, the resource(s) associated with the first portion 704-1 may be separated from the resource(s) associated with the second portion 704-2 by an uplink sub-band (e.g., the UL sub-band 518a) and/or a guard band (e.g., the guard band 520a and the guard band 520c). Although the associated resources may be non-contiguous, the first portion 704-1 and the second portion 704-2 belong to a same (single) CSI-RS resource such that properties indicated by the single CSI-RS resource configuration may apply to both the first portion 704-1 and the second portion 704-2. To illustrate, a periodicity and/or slot offset indicated by the single CSI-RS resource configuration applies to both the first portion 704-1 and the second portion 704-2. Alternatively or additionally, a CSI report configuration associated with the single CSI-RS resource may apply to both the first portion 704-1 and the second portion 704-2.

The example 702 includes a second SBFD format 502-2 and a third SBFD format 502-3 that may be a second instance and a third instance, respectively, of the SBFD format 502 as described with regard to FIG. 5 (shown partially in FIG. 7B for visual brevity). In some aspects, a network node may indicate multiple CSI-RS resources that are linked together in a CSI report. For instance, each CSI-RS resource of the multiple CSI-RS resources may be associated with a different partial DL sub-band, but linked to a same CSI report such that CSI feedback may be based at least in part on the multiple CSI-RS resources. To illustrate, the network node may configure a first CSI-RS resource 706-1 that is based at least in part on one or more resources of the DL sub-band 516c and a second CSI-RS resource 708-1 that is based at least in part on one or more resources of the DL sub-band 516a.

Configuring two CSI-RS resources (e.g., a respective CSI-RS resource for a respective DL sub-band) may provide more flexibility relative to a single CSI-RS resource as described with regard to the first example 700. For example, each CSI-RS resource as described with regard to the second example 702 may be associated with a respective CSI-RS resource configuration and configured independently from one another. The flexibility, however, may result in CSI-RS resources that occur at different times.

To illustrate, the first CSI-RS resource 706-1 and the second resource 708-1 as shown by the SBFD format 502-2 may be configured with a same periodicity and a same slot offset. However, and as shown by the SBFD format 502-3, a first CSI-RS resource 706-2 may be configured with a different slot offset relative to a second CSI-RS resource 708-2. That is, the first CSI-RS resource 706-2 and the second CSI-RS resource 708-2 may be configured with a same periodicity but different slot offsets. For example, and as shown by the SBFD format 502-3, the first CSI-RS resource 706-2 may be configured to occur in a first slot associated with the DL sub-band 516c and the second CSI-RS resource 708-2 may be configured to occur in a second slot associated with the DL sub-band 516b.

The ability to configure DL sub-band CSI-RS resources independently may cause a discrepancy in generating a channel estimation and/or CSI feedback, such as when the DL sub-band CSI-RS resources are linked together in a same CSI report. For instance, and with regard to the third SBFD format 503-3, a network node may change antenna configurations between time slots, such as by changing antenna configurations between the first slot associated with the DL sub-band 516c and the second slot associated with the DL sub-band 516b. Accordingly, the network node may use a first antenna configuration to transmit CSI-RS using the first CSI-RS resource 706-2 and a second, different antenna configuration to transmit the CSI-RS using the second CSI-RS resource 708-2. As one example, the network node may first utilize the antenna panel 604-1 as described with regard to FIG. 6 for transmitting the CSI-RS associated with the first slot and/or the first CSI-RS resource 706-2 and then reconfigure to use the antenna panel 604-2 for transmitting the CSI-RS associated with the second slot and/or the second CSI-RS resource 708-2. As another example, the network node may reconfigure from utilizing the first antenna subarray 614-1 for transmitting the CSI-RS associated with the first slot and/or the first CSI-RS resource 706-2 to the second antenna subarray 614-2 for transmitting the CSI-RS associated with the second slot and/or the second CSI-RS resource 708-2.

Switching between antenna configurations may result in the network node applying different precoding to each transmission. To illustrate, and with reference to the SBFD format 502-3, the network node may select (and apply during precoding) a first precoding matrix based at least in part on using the first antenna configuration for transmitting the CSI-RS associated with the first slot and/or the first CSI-RS resource 706-2. Based at least in part on switching antenna configurations, the network node may select (and apply during precoding) a second precoding matrix based at least in part on using the second antenna configuration for transmitting the CSI-RS associated with the second slot and/or the second CSI-RS resource 708-2. A precoding matrix may specify one or more signal modifications, such as a respective signal modification associated with a respective signal transmitted by a respective antenna element of a phased array. Examples of a signal modification may include a phase modification and/or a gain modification. Applying precoding to a signal (e.g., as indicated and/or specified by a precoding matrix) may improve a signal quality of a resultant beam. Accordingly, changing precoding based at least in part on changing antenna configurations may improve signal quality. However, channel estimation by a UE, such as a UE generating CSI, may be based at least in part on an assumption that precoding remains fixed across a CSI-RS.

To illustrate, a CSI-RS transmission that is based at least in part on the single CSI-RS resource as described with regard to FIG. 7A may utilize constant precoding (e.g., constant precoding across a large-scale component of the precoding) across the transmission. In some aspects, precoding may be decomposed into at least a large-scale component (e.g., associated with large-scale fading) and a small-scale component (e.g., associated with small-scale fading). The large-scale fading and/or small-scale fading associated with the large-scale component and the small-scale component may be based at least in part on a threshold to distinguish between "large" and "small". Although the first portion 704-1 and the second portion 704-2 are based at least in part on non-contiguous resources, the portions share a same time slot and/or same time duration. Accordingly, a network node may refrain from dynamically changing an antenna configuration and utilize the same precoding for transmitting the CSI-RS, and a UE may generate CSI based at least in part on the non-contiguous resources and an assumption that a large-scale component of precoding across a CSI-RS in the non-contiguous resources is constant. Conversely, and based at least in part on separate CSI-RS resources as shown by the SBFD format 502-3, the network node may utilize different antenna configuration for transmitting DL sub-band CSI-RS. Without information that indicates the network node has changed antenna configurations for transmitting DL sub-band CSI-RS, a UE generating a CSI report that is based at least in part on DL sub-band CSI-RS partitioning (e.g., that may occur at different time durations) may assume that the large-scale component precoding is constant and generate erroneous CSI. Using erroneous CSI may result in the network node selecting a signal configuration with reduced signal quality relative to a signal quality associated with other signal configurations. The reduced signal quality may increase recovery errors, reduce data throughput, and/or increase data transfer latencies.

Some techniques and apparatuses described herein provide CSI-RS channel estimation granularity configuration in full-duplex. In some aspects, a network node transmits a channel estimation granularity indication that specifies a channel estimation granularity associated with generating CSI based at least in part on a full-duplex configuration. "Channel estimation granularity" may denote a frequency span and/or a bandwidth size associated with constant precoding (e.g., precoding is constant for a large-scale component for a transmission across the bandwidth) and/or a channel estimation bandwidth. Based at least in part on transmitting the channel estimation granularity indication, the network node may receive the CSI associated with the channel estimation granularity indication.

In some aspects, a UE may receive a channel estimation granularity indication that is associated with generating CSI that is based at least in part on a full-duplex configuration. As further described below, the UE may generate CSI based at least in part on the channel estimation granularity indication, such as by generating one or more channel estimation metrics based at least in part on assuming that precoding is constant for the indicated granularly (e.g., and not assuming that a large-scale component of precoding is constant for frequencies outside of the indicated granularity). Based at least in part on receiving the channel estimation granularity indication, the UE may transmit the CSI that is based at least in part on the channel estimation granularity indication.

By indicating a channel estimation granularity, a network node can configure how a UE generates CSI. That is, the network node may indicate a bandwidth size associated with constant precoding such that the UE may generate more accurate CSI based at least in part on more accurate channel estimations (e.g., relative to not receiving the indication of channel estimation granularity). More accurate CSI may result in the network node selecting a signal configuration with improved signal quality relative to a signal quality associated with other signal configurations. The improved signal quality may reduce recovery errors, increase data throughput, and/or reduce data transfer latencies.

As indicated above, FIGS. 7A and 7B are provided as examples. Other examples may differ from what is described with regard to FIGS. 7A and 7B.

Figure 8:
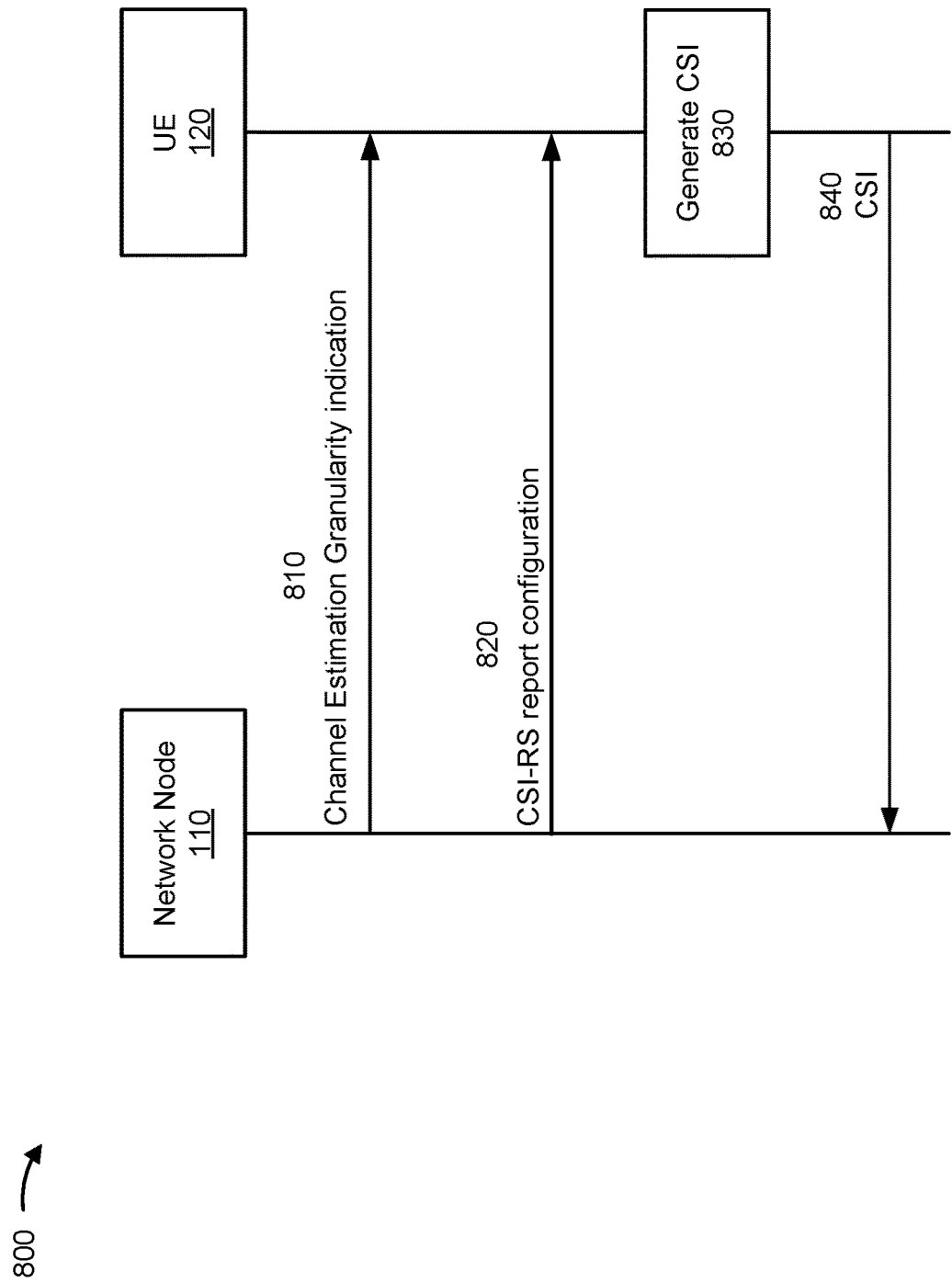
FIG. 8 is a diagram illustrating an example of a wireless communication process between a network node and a UE, in accordance with the present disclosure.

FIG. 8 is a diagram illustrating an example 800 of a wireless communication process between a network node (e.g., the network node 110) and a UE (e.g., the UE 120), in accordance with the present disclosure.

As shown by reference number 810, a network node (e.g., the network node 110) may transmit, and a UE (e.g., the UE 120) may receive, a channel estimation granularity indication. As one example, the network node may indicate a wideband channel estimation granularity. As another example, the network node may indicate a per DL sub-band channel estimation granularity, such as a partial DL sub-band granularity associated with an SBFD format. In some aspects, the network node indicating a per DL sub-band channel estimation granularity may implicitly specify that generating a channel estimation metric based at least in part on averaging over at least two sub-bands is disallowed. For example, the network node may indicate the per DL sub-band channel estimation granularity in CSI-RS resource information (e.g., in CSI-RS resource configuration information) and refrain from explicitly indicating that averaging over at least two sub-bands is disallowed.

Alternatively or additionally, the network node indicating a per DL sub-band channel estimation granularity may implicitly specify that applying a whitening matrix over at least two sub-bands is disallowed. To illustrate, a whitening matrix may be associated with a whitening transform that is applied to a signal to transform colored noise to white noise. For example, a UE may apply a whitening transform (e.g., based at least in part on a whitening matrix that characterizes properties of the whitening transform) to a signal to improve a signal quality. However, a different antenna configuration and/or a different propagation path may result in different colored noise. Accordingly, a first whitening transform associated with a first signal transmitted based at least in part on a first antenna configuration (e.g., a CSI-RS that is based at least in part on a first DL sub-band at a first time slot) may not be applicable to a second signal transmitted based at least in part on a second antenna configuration (e.g., the CSI-RS that is based at least in part on a second DL sub-band at a second time slot).

In some aspects, the network node may transmit the channel estimation granularity indication with CSI-RS resource information. As one example, the network node may transmit the channel estimation granularity indication as part of CSI-RS resource configuration information (e.g.,
CSI-RS-resourceConfig). To illustrate, the network node may indicate, in the CSI-RS resource configuration information, a first CSI-RS resource associated with a DL sub-band resource (e.g., the DL sub-band 516a and/or the DL sub-band 516b) and a second CSI-RS resource associated with a second DL sub-band resource (e.g., the DL sub-band 516c and/or the DL sub-band 516d). In some aspects, the network node may indicate, in the CSI-RS resource configuration information and as the channel estimation granularity indication, a respective channel estimation granularity for each DL sub-band resource. While described as a respective channel estimation granularity for two CSI resources, other examples may indicate a respective channel estimation granularity for more or fewer CSI-RS resources (e.g., DL sub-band resources).

The network node may indicate to determine a channel estimation granularity based at least in part on a slot type. As one example, the network node may transmit a bit field (e.g., in a radio resource control (RRC) message, in a medium access control (MAC) control element (CE), in downlink control information (DCI), and/or in CSI-RS configuration information) that indicates whether to activate or deactivate determining the channel estimation granularity based at least in part on the slot type. To illustrate, a first value (e.g., "1") in the bit field may indicate to activate determining the channel estimation granularity based at least in part on the slot type, and a second value (e.g., "0") in the bit field may indicate to deactivate determining the channel estimation granularity based at least in part on the slot type. A slot type may be based at least in part on whether the slot is included in an SBFD format or not. For example, a slot type may be a wideband slot type associated with an SBFD format (e.g., the DL band associated with the time duration 506) and/or a sub-band slot type associated with the SBFD format (e.g., the DL sub-band 516a and/or the DL sub-band 516c associated with the time duration 512).

Alternatively or additionally, the network node may transmit, either with the channel estimation granularity indication or separately from the channel estimation granularity indication, a preferred physical resource block (PRB) indication associated with the CSI-RS resource. In some aspects, a PRB specified by the preferred PRB indication may be based at least in part on a PRB of multiple PRBs, such as a PRB that has a smallest precoding size out of the multiple PRBs. As another example, the PRB specified by the preferred PRB indication may be based at least in part on an association between a physical downlink shared channel (PDSCH) precoding PRB size and a CSI-RS precoding PRB size.

As shown by reference number 820, the network node may transmit, and the UE may receive, a CSI reporting granularity indication that is associated with generating the CSI. "CSI reporting granularity" may denote a frequency span and/or a bandwidth size associated with generating a CSI metric. For example, the CSI reporting granularity indication may specify a wideband CSI reporting granularity that indicates to generate CSI based at least in part on using a wideband signal (e.g., the DL band 504). Alternatively or additionally, the reporting indication may specify a DL sub-band reporting granularity that indicates to generate CSI based at least in part on using a DL sub-band signal. In some aspects, a sub-band size associated with the CSI reporting granularity may be based at least in part on a number of PRBs included in a bandwidth part (BWP) size. For example, for a BWP that includes 24-72 PRBs, the sub-band size may be 4 PRBs or 8 PRBs, for a BWP that includes 73-144 PRBs, the sub-band size may be 8 PRBs or 16 PRBs granularity, and/or for a BWP that includes 145-275 PRBs, the sub-band size may be 16 or 32.

In some aspects, the network node may indicate, by way of the CSI reporting granularity indication, both a wideband CSI reporting granularity and a DL sub-band reporting granularity. The network node may alternatively or additionally specify different reporting periodicities associated with the wideband CSI reporting granularity and the DL sub-band reporting granularity. For instance, the network node may indicate (e.g., based at least in part on one or more CSI-RS resource configurations) a first periodicity associated with using the wideband CSI reporting granularity and a second periodicity associated with using the DL sub-band reporting granularity, where the first periodicity and the second periodicity are different. The first periodicity may be longer than the second periodicity or the second periodicity may be longer than the first periodicity. In other examples, the wideband CSI reporting granularity and the DL sub-band reporting granularity may be associated with a same periodicity.

While the example 800 shows the network node transmitting the CSI reporting granularity indication separately from the channel estimation granularity indication, other examples may include the network node transmitting the CSI reporting granularity indication in a same transmission as the channel estimation granularity indication. For example, the network node may transmit the CSI reporting granularity indication and the channel estimation granularity indication in a same RRC message. As another example, the CSI reporting granularity indication may implicitly specify the channel estimation granularity. That is, the channel estimation indication as shown by the reference number 810 may be based at least in part on the network node transmitting the CSI reporting granularity indication (e.g., a CSI reporting granularity may implicitly specify a channel estimation granularity). To illustrate, the CSI reporting granularity indication may specify a DL sub-band reporting granularity and implicitly specify a downlink sub-band channel estimation granularity. Accordingly, the CSI reporting granularity indication may be interpreted as the channel estimation granularity indication. Based at least in part on the CSI reporting granularity indication specifying the DL sub-band reporting granularity, a wideband channel estimation granularity for generating the CSI may be disallowed.

As shown by reference number 830, the UE may generate CSI based at least in part on the channel estimation granularity indication and/or the CSI reporting granularity indication. In some aspects, the channel estimation granularity indication may specify a different granularity than the CSI reporting granularity indication. As one example, the channel estimation granularity indication may specify a wideband channel estimation granularity and the CSI reporting granularity indication may specify a DL sub-band reporting granularity (e.g., associated with a full-duplex configuration, such as the SBFD format 502). Based at least in part on CSI-RS resource information (e.g., received by the UE as shown by the reference number 810) indicating a CSI resource that is associated with at least two downlink sub-bands (e.g., the single CSI resource as described with regard to FIG. 7A), the UE may generate the CSI based at least in part on using the wideband channel estimation granularity (e.g., the UE may assume large-scale component constant precoding across the wideband). In some aspects, and based at least in part on the CSI-RS resource being associated with a full-duplex configuration, the UE may refrain from generating the CSI using an uplink band associated with the full-duplex configuration.

In some aspects, for a single CSI-RS resource that is associated with at least two sub-bands, the channel estimation granularity indication may specify a same granularity as, and/or a granularity associated with, the CSI reporting granularity indication. For example, the CSI reporting granularity indication may specify a DL sub-band reporting granularity and the channel estimation granularity indication may specify a downlink sub-band channel estimation granularity. Based at least in part on CSI-RS resource information indicating that the CSI resource is associated with at least two downlink sub-bands (e.g., as described with regard to the example 700 of FIG. 7A), the UE may generate the CSI based at least in part on dividing the CSI resource associated with the at least two downlink sub-bands into at least two reporting sub-bands. In generating CSI based at least in part on dividing the CSI resource, the UE may assume that a same precoding has been applied to each sub-band. To illustrate, the UE may generate first CSI based at least in part on a first portion of the CSI resource (e.g., associated with a first downlink sub-band of the two downlink sub-bands) and second CSI based at least in part on a second portion of the CSI resource (e.g., associated with a second downlink sub-band of the two downlink sub-bands).

In some aspects, the UE may refrain from generating the CSI based at least in part on a number of sub-bands that exceed a sub-band limit. To illustrate, a communication standard may limit a number of sub-bands that may be included in a bandwidth and/or a bandwidth part (e.g., associated with a CSI-RS resource). As one example, the communication standard may limit the number of sub-bands to 19. In some aspects, the UE may refrain from generating the CSI for more than a number of portions and/or sub-bands of a CSI resource that exceed the sub-band limit (e.g., 19).

The UE may generate a single CSI using multiple portions of a CSI-RS resource (e.g., as described with regard to the example 700 of FIG. 7A). To illustrate, for a single CSI-RS resource that is associated with at least two sub-bands, the channel estimation granularity indication may specify a same and/or associated granularity as the CSI reporting granularity indication. In some aspects, the UE may generate a single CSI based at least in part on a first portion of the CSI resource associated with a first downlink sub-band and a second portion of the CSI resource associated with a second downlink sub-band. For example, the UE may derive one or more common CSI parameters, and generate the single CSI based at least in part on the one or more common CSI parameters. For example, the UE may derive a first CSI metric for the first portion and a second CSI metric and generate an averaged CSI metric and/or select the CSI metric associated with worse performance. Deriving the common CSI parameter(s) may include the UE deriving the common CSI parameter(s) based at least in part on using a UE-specific derivation algorithm and/or based at least in part on a standards-defined derivation algorithm.

As shown by reference number 840, the UE may transmit, and the network node may receive, CSI that is based at least in part on the channel estimation granularity indication. As one example, the UE may transmit the CSI generated as described with regard to the reference number 830 based at least in part on an RRC message. The UE may transmit the CSI periodically and/or based at least in part on parameters indicated in CSI report configuration information.

By indicating a channel estimation granularity, a network node can configure how a UE generates CSI. That is, the network node may indicate a bandwidth size associated with large-scale component constant precoding such that the UE may generate more accurate CSI based at least in part on more accurate channel estimations (e.g., relative to not receiving the indication of channel estimation granularity). More accurate CSI may result in the network node selecting a signal configuration with improved signal quality, relative to a signal quality associated with other signal configurations. The improved signal quality may reduce recovery errors, increase data throughput, and/or reduce data transfer latencies.

As indicated above, FIG. 8 is provided as an example. Other examples may differ from what is described with regard to FIG. 8.

Figure 9:
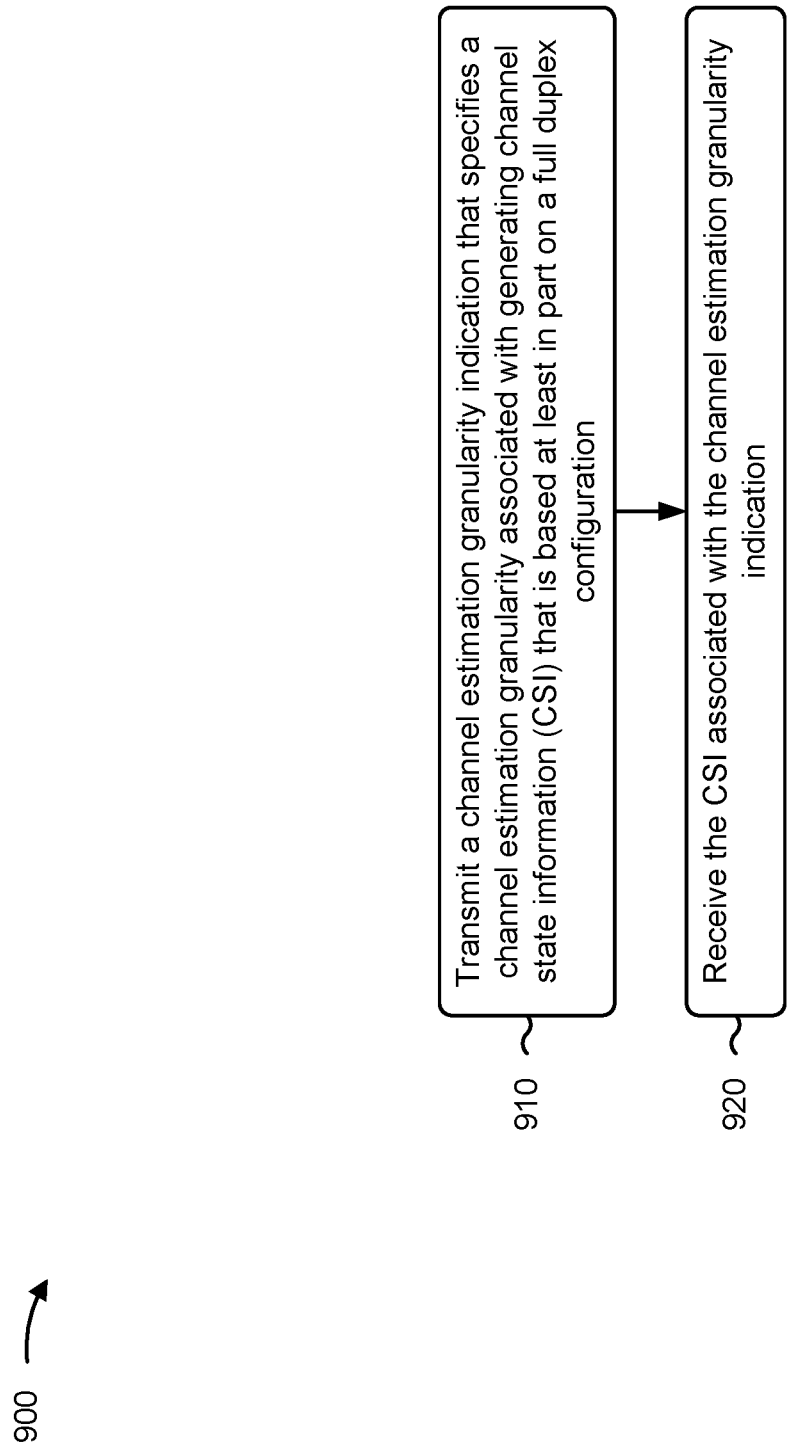
FIG. 9 is a diagram illustrating an example process performed, for example, by a network node, in accordance with the present disclosure.

FIG. 9 is a diagram illustrating an example process 900 performed, for example, by a network node, in accordance with the present disclosure. Example process 900 is an example where the network node (e.g., network node 110) performs operations associated with channel state information reference signal estimation granularity configuration in full-duplex.

As shown in FIG. 9, in some aspects, process 900 may include transmitting a channel estimation granularity indication that specifies a channel estimation granularity associated with generating CSI that is based at least in part on a full-duplex configuration (block 910). For example, the network node (e.g., using communication manager 150 and/or transmission component 1104, depicted in FIG. 11) may transmit a channel estimation granularity indication that specifies a channel estimation granularity associated with generating CSI that is based at least in part on a full-duplex configuration, as described above.

As further shown in FIG. 9, in some aspects, process 900 may include receiving the CSI associated with the channel estimation granularity indication (block 920). For example, the network node (e.g., using communication manager 150 and/or reception component 1102, depicted in FIG. 11) may receive the CSI associated with the channel estimation granularity indication, as described above.

Process 900 may include additional aspects, such as any single aspect or any combination of aspects described below and/or in connection with one or more other processes described elsewhere herein.

In a first aspect, the channel estimation granularity indication specifies a wideband channel estimation granularity.

In a second aspect, alone or in combination with the first aspect, the channel estimation granularity indication specifies a per downlink sub-band channel estimation granularity.

In a third aspect, alone or in combination with one or more of the first and second aspects, the channel estimation granularity indication specifies, based at least in part on specifying the per downlink sub-band channel estimation granularity, that generating a channel estimation metric by averaging over at least two sub-bands is disallowed.

In a fourth aspect, alone or in combination with one or more of the first through third aspects, the channel estimation granularity indication specifies, based at least in part on specifying the per downlink sub-band channel estimation granularity, that applying a whitening matrix over at least two sub-bands is disallowed.

In a fifth aspect, alone or in combination with one or more of the first through fourth aspects, transmitting the channel estimation granularity indication includes transmitting the channel estimation granularity indication in CSI-RS resource configuration information.

In a sixth aspect, alone or in combination with one or more of the first through fifth aspects, the CSI-RS resource configuration information specifies at least two downlink sub-band resources, and the CSI-RS resource configuration information indicates, as at least part of the channel estimation granularity indication, a respective channel estimation granularity for each downlink sub-band resource of the at least two downlink sub-band resources.

In a seventh aspect, alone or in combination with one or more of the first through sixth aspects, the channel estimation granularity indication specifies to determine a channel estimation granularity based at least in part on a slot type.

In an eighth aspect, alone or in combination with one or more of the first through seventh aspects, the channel estimation granularity indication is based at least in part on a bit field that indicates whether to activate or deactivate determining the channel estimation granularity based at least in part on the slot type.

In a ninth aspect, alone or in combination with one or more of the first through eighth aspects, process 900 includes transmitting a preferred PRB indication associated with generating the CSI.

In a tenth aspect, alone or in combination with one or more of the first through ninth aspects, a PRB specified by the preferred PRB indication is based at least in part on at least one of a PRB of multiple PRBs with a smallest precoding size of the multiple PRBs, or an association between a physical downlink shared channel precoding PRB size and a CSI-RS PRB size.

In an eleventh aspect, alone or in combination with one or more of the first through tenth aspects, process 900 includes transmitting a CSI reporting granularity indication that is associated with generating the CSI.

In a twelfth aspect, alone or in combination with one or more of the first through eleventh aspects, the CSI reporting granularity indication specifies at least one of a wideband CSI reporting granularity, or a DL sub-band reporting granularity.

In a thirteenth aspect, alone or in combination with one or more of the first through twelfth aspects, the CSI reporting granularity indication specifies both the wideband CSI reporting granularity and the DL sub-band reporting granularity, where the wideband CSI reporting granularity is based at least in part on a first periodicity, where the DL sub-band reporting granularity is based at least in part on a second periodicity, and where the first periodicity is different from the second periodicity.

In a fourteenth aspect, alone or in combination with one or more of the first through thirteenth aspects, the channel estimation granularity indication is based at least in part on the CSI reporting granularity indication.

In a fifteenth aspect, alone or in combination with one or more of the first through fourteenth aspects, the CSI reporting granularity indication specifies a DL sub-band reporting granularity, and the channel estimation granularity indication specifies, based at least in part on the CSI reporting granularity indication specifying the DL sub-band reporting granularity, that a wideband channel estimation granularity for generating the CSI is disallowed.

In a sixteenth aspect, alone or in combination with one or more of the first through fifteenth aspects, the CSI reporting granularity indication implicitly specifies the channel estimation granularity indication.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
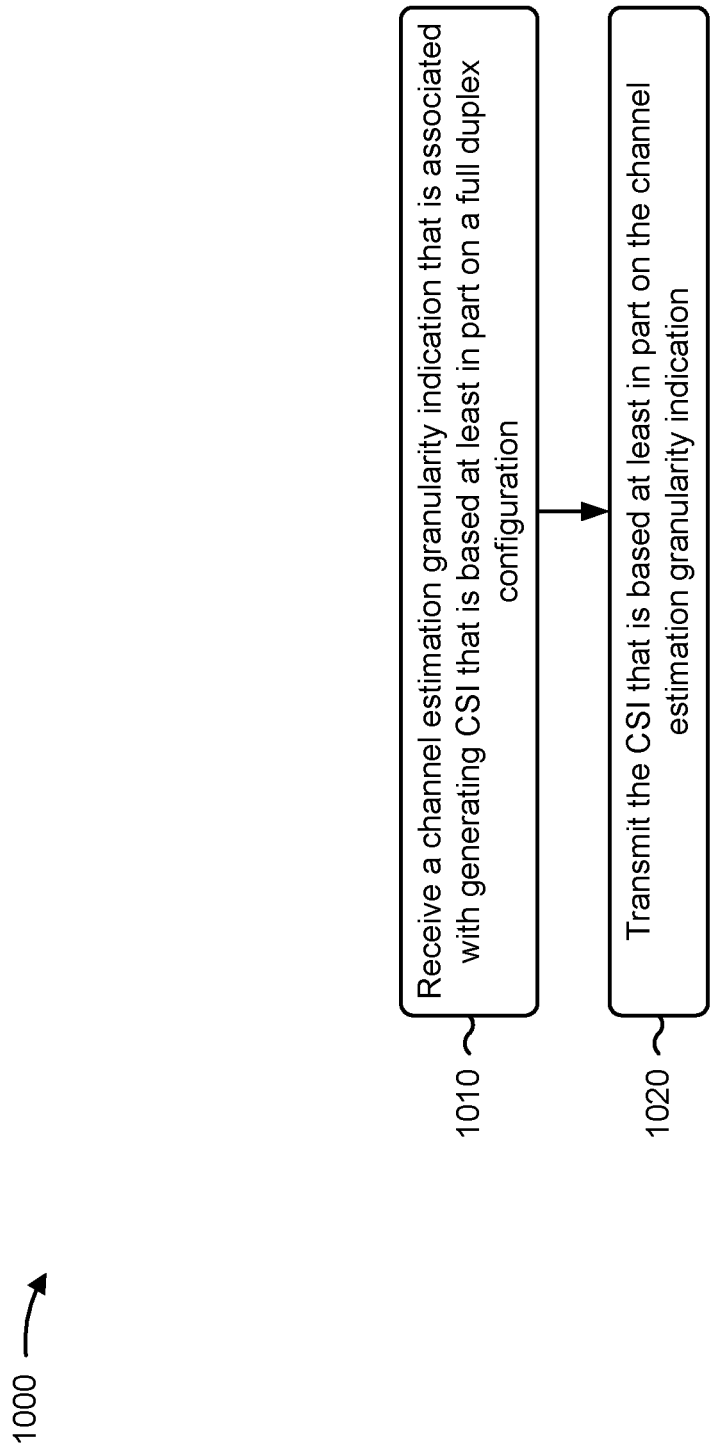
FIG. 10 is a diagram illustrating an example process performed, for example, by a UE, in accordance with the present disclosure.

FIG. 10 is a diagram illustrating an example process 1000 performed, for example, by a UE, in accordance with the present disclosure. Example process 1000 is an example where the UE (e.g., UE 120) performs operations associated with channel state information reference signal estimation granularity configuration in full-duplex.

As shown in FIG. 10, in some aspects, process 1000 may include receiving a channel estimation granularity indication that is associated with generating CSI that is based at least in part on a full-duplex configuration (block 1010). For example, the UE (e.g., using communication manager 140 and/or reception component 1202, depicted in FIG. 12) may receive a channel estimation granularity indication that is associated with generating CSI that is based at least in part on a full-duplex configuration, as described above.

As further shown in FIG. 10, in some aspects, process 1000 may include transmitting the CSI that is based at least in part on the channel estimation granularity indication (block 1020). For example, the UE (e.g., using communication manager 140 and/or transmission component 1204, depicted in FIG. 12) may transmit the CSI that is based at least in part on the channel estimation granularity indication, as described above.

Process 1000 may include additional aspects, such as any single aspect or any combination of aspects described below and/or in connection with one or more other processes described elsewhere herein.

In a first aspect, the channel estimation granularity indication specifies a wideband channel estimation granularity.

In a second aspect, alone or in combination with the first aspect, the channel estimation granularity indication specifies a per downlink sub-band channel estimation granularity.

In a third aspect, alone or in combination with one or more of the first and second aspects, the channel estimation granularity indication indicates, based at least in part on specifying the per downlink sub-band channel estimation granularity, that averaging a channel estimation metric over at least two sub-bands is disallowed.

In a fourth aspect, alone or in combination with one or more of the first through third aspects, the channel estimation granularity indication indicates, based at least in part on specifying the per downlink sub-band channel estimation granularity, that applying a whitening matrix over at least two sub-bands is disallowed.

In a fifth aspect, alone or in combination with one or more of the first through fourth aspects, receiving the channel estimation granularity indication includes receiving the channel estimation granularity indication in CSI-RS resource configuration information.

In a sixth aspect, alone or in combination with one or more of the first through fifth aspects, the CSI-RS resource configuration information specifies at least two downlink sub-band resources, and the CSI-RS resource configuration information indicates, as at least part of the channel estimation granularity indication, a respective channel estimation granularity for each downlink sub-band resource of the at least two downlink sub-band resources.

In a seventh aspect, alone or in combination with one or more of the first through sixth aspects, the channel estimation granularity indication specifies to determine a channel estimation granularity based at least in part on a slot type.

In an eighth aspect, alone or in combination with one or more of the first through seventh aspects, the channel estimation granularity indication is based at least in part on a bit field that indicates whether to activate or deactivate determining the channel estimation granularity based at least in part on the slot type.

In a ninth aspect, alone or in combination with one or more of the first through eighth aspects, process 1000 includes receiving a preferred PRB indication associated with generating the CSI.

In a tenth aspect, alone or in combination with one or more of the first through ninth aspects, a PRB specified by the preferred PRB indication is based at least in part on at least one of a PRB of multiple PRBs with a smallest precoding size of the multiple PRBs, or an association between a physical downlink shared channel precoding PRB size and a CSI-RS PRB size.

In an eleventh aspect, alone or in combination with one or more of the first through tenth aspects, process 1000 includes receiving a CSI reporting granularity indication that is associated with generating the CSI.

In a twelfth aspect, alone or in combination with one or more of the first through eleventh aspects, the CSI reporting granularity indication specifies at least one of a wideband CSI reporting granularity, or a DL sub-band reporting granularity.

In a thirteenth aspect, alone or in combination with one or more of the first through twelfth aspects, the CSI reporting granularity indication specifies both the wideband CSI reporting granularity and the DL sub-band reporting granularity, where the wideband CSI reporting granularity is based at least in part on a first periodicity, where the DL sub-band reporting granularity is based at least in part on a second periodicity, and where the first periodicity is different from the second periodicity.

In a fourteenth aspect, alone or in combination with one or more of the first through thirteenth aspects, the channel estimation granularity indication is based at least in part on the CSI reporting granularity indication.

In a fifteenth aspect, alone or in combination with one or more of the first through fourteenth aspects, the CSI reporting granularity indication specifies a DL sub-band reporting granularity, and the channel estimation granularity indication specifies, based at least in part on the CSI reporting granularity indication specifying the DL sub-band reporting granularity, that a wideband channel estimation granularity for generating the CSI is disallowed.

In a sixteenth aspect, alone or in combination with one or more of the first through fifteenth aspects, the CSI reporting granularity indication implicitly specifies the channel estimation granularity indication.

In a seventeenth aspect, alone or in combination with one or more of the first through sixteenth aspects, process 1000 includes generating the CSI based at least in part on the CSI reporting granularity indication and the channel estimation granularity indication.

In an eighteenth aspect, alone or in combination with one or more of the first through seventeenth aspects, the CSI reporting granularity indication specifies the DL sub-band reporting granularity, where the channel estimation granularity indication specifies a wideband channel estimation granularity, where CSI-RS resource information indicates a CSI resource associated with at least two downlink sub-bands, and where generating the CSI includes generating the CSI based at least in part on using the wideband channel estimation granularity.

In a nineteenth aspect, alone or in combination with one or more of the first through eighteenth aspects, generating the CSI further includes refraining from generating the CSI based at least in part on an uplink band associated with the full-duplex configuration.

In a twentieth aspect, alone or in combination with one or more of the first through nineteenth aspects, generating the CSI further includes refraining from generating the CSI based at least in part on a guard band associated with the full-duplex configuration.

In a twenty-first aspect, alone or in combination with one or more of the first through twentieth aspects, the CSI reporting granularity indication specifies the DL sub-band reporting granularity, where the channel estimation granularity indication specifies a downlink sub-band channel estimation granularity, where CSI-RS resource information indicates a CSI resource associated with at least two downlink sub-bands, and where generating the CSI includes generating the CSI based at least in part on dividing the CSI resource associated with the at least two downlink sub-bands into at least two reporting sub-bands.

In a twenty-second aspect, alone or in combination with one or more of the first through twenty-first aspects, generating the CSI based at least in part on dividing the CSI resource includes reporting a first CSI based at least in part on a first portion of the CSI resource associated with a first downlink sub-band of the at least two downlink sub-bands, and reporting a second CSI based at least in part on a second portion of the CSI resource associated with a second downlink sub-band of the at least two downlink sub-bands.

In a twenty-third aspect, alone or in combination with one or more of the first through twenty-second aspects, generating the CSI based at least in part on dividing the CSI resource further includes refraining from generating CSI for more than 19 portions of the CSI resource.

In a twenty-fourth aspect, alone or in combination with one or more of the first through twenty-third aspects, the CSI reporting granularity indication specifies the DL sub-band reporting granularity, where the channel estimation granularity indication specifies a downlink sub-band channel estimation granularity, where CSI-RS resource information indicates a CSI resource associated with at least two downlink sub-bands, and where generating the CSI includes generating a single CSI based at least in part on a first portion of the CSI resource associated with a first downlink sub-band of the at least two downlink sub-bands and a second portion of the CSI resource associated with a second downlink sub-band of the at least two downlink sub-bands.

In a twenty-fifth aspect, alone or in combination with one or more of the first through twenty-fourth aspects, process 1000 includes deriving one or more common CSI parameters, and generating the single CSI is based at least in part on the one or more common CSI parameters.

In a twenty-sixth aspect, alone or in combination with one or more of the first through twenty-fifth aspects, deriving the one or more common CSI parameters is based at least in part on a UE-specific derivation algorithm.

In a twenty-seventh aspect, alone or in combination with one or more of the first through twenty-sixth aspects, deriving the one or more common CSI parameters is based at least in part on a standards-defined derivation algorithm.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
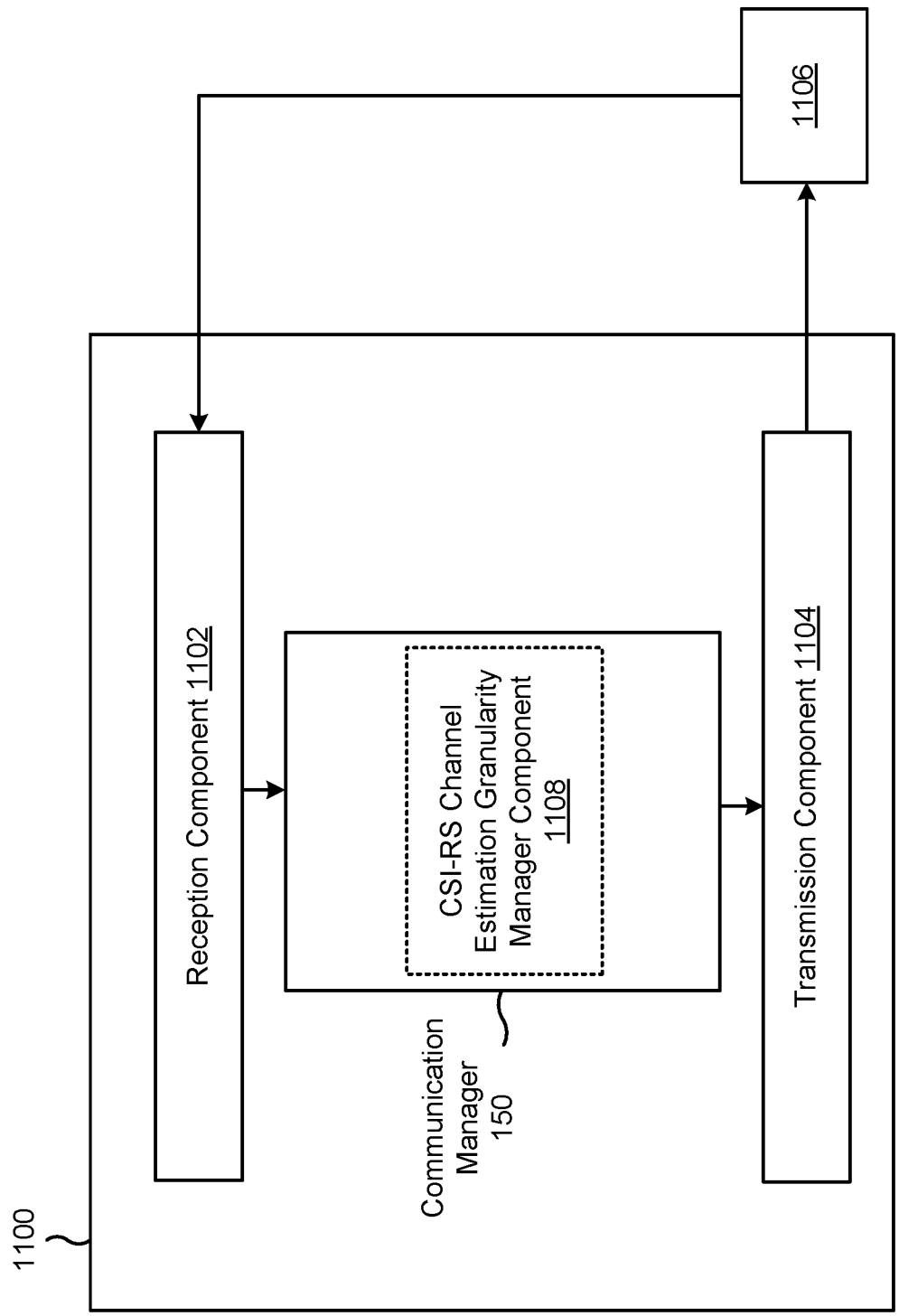
FIG. 11 is a diagram of an example apparatus for wireless communication, in accordance with the present disclosure.

FIG. 11 is a diagram of an example apparatus 1100 for wireless communication, in accordance with the present disclosure. The apparatus 1100 may be a network node, or a network node may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 150. The communication manager 150) may include one or more of a CSI-RS channel estimation granularity manager component 1108, among other examples.

In some aspects, the apparatus 1100 may be configured to perform one or more operations described herein in connection with FIGS. 7-10. Additionally, or alternatively, the apparatus 1100 may be configured to perform one or more processes described herein, such as process 900 of FIG. 9, or a combination thereof. In some aspects, the apparatus 1100 and/or one or more components shown in FIG. 11 may include one or more components of the network node described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the network node described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the network node described in connection with FIG. 2. In some aspects, the transmission component 1104 may be co-located with the reception component 1102 in a transceiver.

The CSI-RS channel estimation granularity manager component 1108 may transmit, by way of the transmission component 1104, a channel estimation granularity indication that specifies a channel estimation granularity associated with generating CSI that is based at least in part on a full-duplex configuration. The reception component 1102 may receive the CSI associated with the channel estimation granularity indication.

The CSI-RS channel estimation granularity manager component 1108 may transmit, by way of the transmission component 1104, a preferred PRB indication associated with generating the CSI. Alternatively or additionally, the CSI-RS channel estimation granularity manager component 1108 may transmit, by way of the transmission component 1104, a CSI reporting granularity indication that is associated with generating the CSI.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
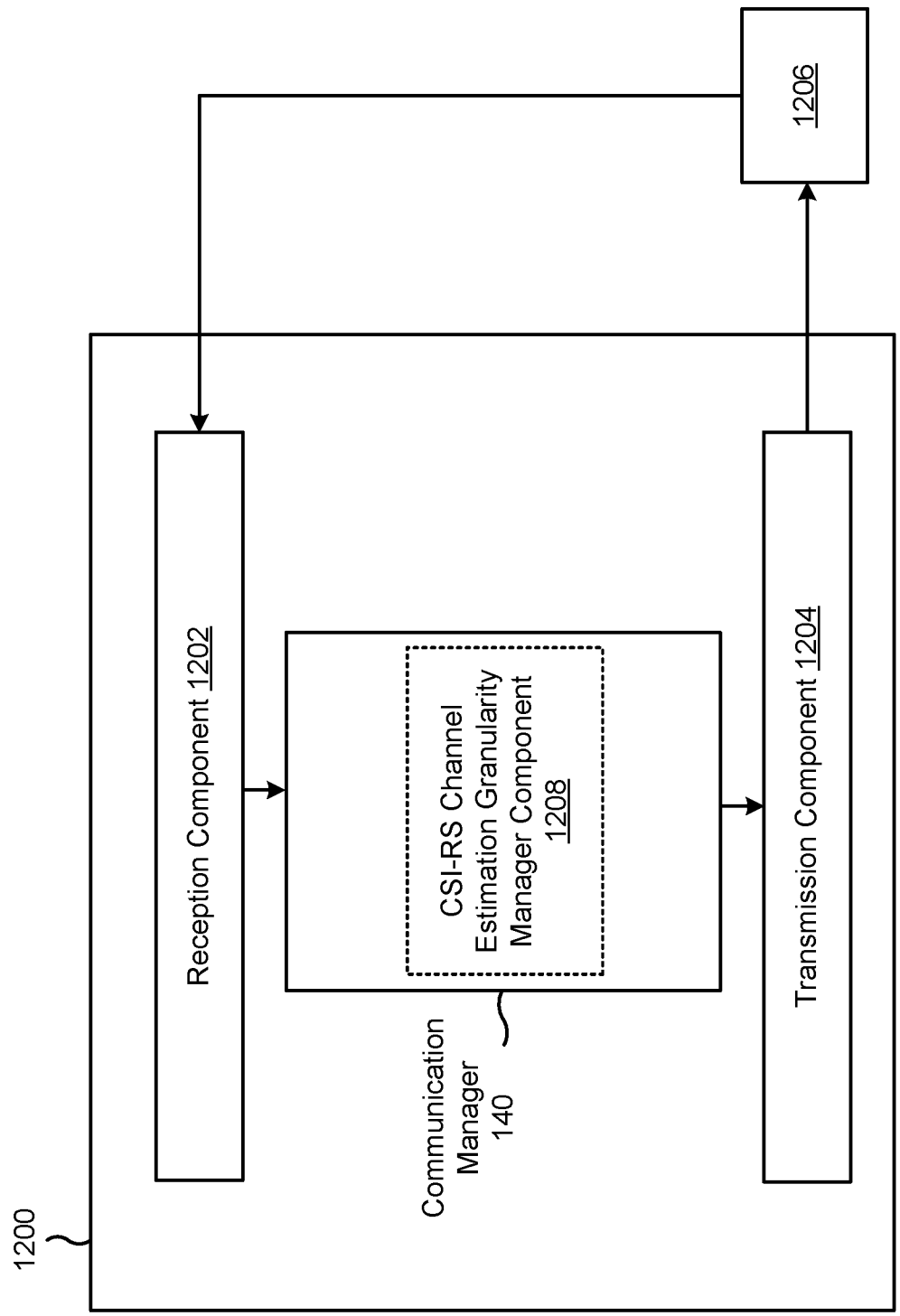
FIG. 12 is a diagram of an example apparatus for wireless communication, in accordance with the present disclosure.

FIG. 12 is a diagram of an example apparatus 1200 for wireless communication, in accordance with the present disclosure. The apparatus 1200 may be a UE, or a UE may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include the communication manager 140. The communication manager 140 may include one or more of a CSI-RS channel estimation granularity manager component 1208, among other examples.

In some aspects, the apparatus 1200 may be configured to perform one or more operations described herein in connection with FIGS. 7-10. Additionally, or alternatively, the apparatus 1200 may be configured to perform one or more processes described herein, such as process 1000 of FIG. 10, or a combination thereof. In some aspects, the apparatus 1200 and/or one or more components shown in FIG. 12 may include one or more components of the UE described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the UE described in connection with FIG. 2.

The transmission component 1204 may transmit communications, such as reference signals, control information, data communications, or a combination thereof, to the apparatus 1206. In some aspects, one or more other components of the apparatus 1200 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modem, a modulator, a transmit MIMO processor, a transmit processor, a controller/processor, a memory, or a combination thereof, of the UE described in connection with FIG. 2. In some aspects, the transmission component 1204 may be co-located with the reception component 1202 in a transceiver.

The CSI-RS channel estimation granularity manager component 1208 may receive, by way of the reception component 1202, a channel estimation granularity indication that is associated with generating CSI that is based at least in part on a full-duplex configuration. The CSI-RS channel estimation granularity manager component 1208 may transmit, by way of the transmission component 1204, the CSI that is based at least in part on the channel estimation granularity indication.

The CSI-RS channel estimation granularity manager component 1208 may receive, by way of the reception component 1202, a preferred PRB indication associated with generating the CSI. Alternatively or additionally, the CSI-RS channel estimation granularity manager component 1208 may receive, by way of the reception component 1202, a CSI reporting granularity indication that is associated with generating the CSI.

In some aspects, the CSI-RS channel estimation granularity manager component 1208 may generate the CSI based at least in part on the CSI reporting granularity indication and the channel estimation granularity indication. The CSI-RS channel estimation granularity manager component 1208 may generate the CSI based at least in part on one or more common CSI parameters. In some aspects, the CSI-RS channel estimation granularity manager component 1208 may derive the one or more common CSI parameters.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

The following provides an overview of some Aspects of the present disclosure:

Aspect 1: A method of wireless communication performed by a network node, comprising: transmitting a channel estimation granularity indication that specifies a channel estimation granularity associated with generating channel state information (CSI) that is based at least in part on a full-duplex configuration; and receiving the CSI associated with the channel estimation granularity indication.

Aspect 2: The method of Aspect 1, wherein the channel estimation granularity indication specifies: a wideband channel estimation granularity.

Aspect 3: The method of Aspect 1, wherein the channel estimation granularity indication specifies: a per downlink sub-band channel estimation granularity.

Aspect 4: The method of Aspect 3, wherein the channel estimation granularity indication specifies, based at least in part on specifying the per downlink sub-band channel estimation granularity, that generating a channel estimation metric by averaging over at least two sub-bands is disallowed.

Aspect 5: The method of Aspect 3 or Aspect 4, wherein the channel estimation granularity indication specifies, based at least in part on specifying the per downlink sub-band channel estimation granularity, that applying a whitening matrix over at least two sub-bands is disallowed.

Aspect 6: The method of any one of Aspects 1-5, wherein transmitting the channel estimation granularity indication comprises: transmitting the channel estimation granularity indication in CSI reference signal (CSI-RS) resource information.

Aspect 7: The method of Aspect 6, wherein the CSI-RS resource information specifies at least two downlink sub-band resources, and wherein the CSI-RS resource information indicates, as at least part of the channel estimation granularity indication, a respective channel estimation granularity for each downlink sub-band resource of the at least two downlink sub-band resources.

Aspect 8: The method of any one of Aspects 1-7, wherein the channel estimation granularity indication specifies to determine a channel estimation granularity based at least in part on a slot type.

Aspect 9: The method of Aspect 8, wherein the channel estimation granularity indication is based at least in part on a bit field that indicates whether to activate or deactivate determining the channel estimation granularity based at least in part on the slot type.

Aspect 10: The method of any one of Aspects 1-9, further comprising: transmitting a preferred physical resource block (PRB) indication associated with generating the CSI.

Aspect 11: The method of Aspect 10, wherein a PRB specified by the preferred PRB indication is based at least in part on at least one of: a PRB of multiple PRBs with a smallest precoding size of the multiple PRBs, or an association between a physical downlink shared channel precoding PRB size and a CSI-RS PRB size.

Aspect 12: The method of any one of Aspects 1-11, further comprising: transmitting a CSI reporting granularity indication that is associated with generating the CSI.

Aspect 13: The method of Aspect 12, wherein the CSI reporting granularity indication specifies at least one of: a wideband CSI reporting granularity, or a downlink sub-band reporting granularity.

Aspect 14: The method of Aspect 13, wherein the CSI reporting granularity indication specifies both the wideband CSI reporting granularity and the downlink sub-band reporting granularity, wherein the wideband CSI reporting granularity is based at least in part on a first periodicity, wherein the downlink sub-band reporting granularity is based at least in part on a second periodicity, and wherein the first periodicity is different from the second periodicity.

Aspect 15: The method of Aspect 13, wherein the channel estimation granularity indication is based at least in part on the CSI reporting granularity indication.

Aspect 16: The method of Aspect 15, wherein the CSI reporting granularity indication specifies a downlink sub-band reporting granularity, and wherein the channel estimation granularity indication specifies, based at least in part on the CSI reporting granularity indication specifying the downlink sub-band reporting granularity, that a wideband channel estimation granularity for generating the CSI is disallowed.

Aspect 17: The method of Aspect 16, wherein the CSI reporting granularity indication implicitly specifies the channel estimation granularity indication.

Aspect 18: A method of wireless communication performed by a user equipment (UE), comprising: receiving a channel estimation granularity indication that is associated with generating channel state information (CSI) that is based at least in part on a full-duplex configuration; and transmitting the CSI that is based at least in part on the channel estimation granularity indication.

Aspect 19: The method of Aspect 18, wherein the channel estimation granularity indication specifies: a wideband channel estimation granularity.

Aspect 20: The method of Aspect 18, wherein the channel estimation granularity indication specifies: a per downlink sub-band channel estimation granularity.

Aspect 21: The method of Aspect 20, wherein the channel estimation granularity indication indicates, based at least in part on specifying the per downlink sub-band channel estimation granularity, that averaging a channel estimation metric over at least two sub-bands is disallowed.

Aspect 22: The method of Aspect 20 or Aspect 21, wherein the channel estimation granularity indication indicates, based at least in part on specifying the per downlink sub-band channel estimation granularity, that applying a whitening matrix over at least two sub-bands is disallowed.

Aspect 23: The method of any one of Aspects 18-22, wherein receiving the channel estimation granularity indication comprises: receiving the channel estimation granularity indication in CSI reference signal (CSI-RS) resource information.

Aspect 24: The method of Aspect 23, wherein the CSI-RS resource information specifies at least two downlink sub-band resources, and wherein the CSI-RS resource information indicates, as at least part of the channel estimation granularity indication, a respective channel estimation granularity for each downlink sub-band resource of the at least two downlink sub-band resources.

Aspect 25: The method of any one of Aspects 18-24, wherein the channel estimation granularity indication specifies to determine a channel estimation granularity based at least in part on a slot type.

Aspect 26: The method of Aspect 25, wherein the channel estimation granularity indication is based at least in part on a bit field that indicates whether to activate or deactivate determining the channel estimation granularity based at least in part on the slot type.

Aspect 27: The method of any one of Aspects 18-26, further comprising: receiving a preferred physical resource block (PRB) indication associated with generating the CSI.

Aspect 28: The method of Aspect 27, wherein a PRB specified by the preferred PRB indication is based at least in part on at least one of: a PRB of multiple PRBs with a smallest precoding size of the multiple PRBs, or an association between a physical downlink shared channel precoding PRB size and a CSI-RS PRB size.

Aspect 29: The method of any one of Aspects 18-28, further comprising: receiving a CSI reporting granularity indication that is associated with generating the CSI.

Aspect 30: The method of Aspect 29, wherein the CSI reporting granularity indication comprises at least one of: a wideband CSI reporting granularity, or a downlink sub-band reporting granularity.

Aspect 31: The method of Aspect 30, wherein the CSI reporting granularity indication specifies both the wideband CSI reporting granularity and the downlink sub-band reporting granularity, wherein the wideband CSI reporting granularity is based at least in part on a first periodicity, wherein the downlink sub-band reporting granularity is based at least in part on a second periodicity, and wherein the first periodicity is different from the second periodicity.

Aspect 32: The method of Aspect 31, wherein the channel estimation granularity indication is based at least in part on the CSI reporting granularity indication.

Aspect 33: The method of Aspect 32, wherein the CSI reporting granularity indication specifies a downlink sub-band reporting granularity, and wherein the channel estimation granularity indication specifies, based at least in part on the CSI reporting granularity indication specifying the downlink sub-band reporting granularity, that a wideband channel estimation granularity for generating the CSI is disallowed.

Aspect 34: The method of any one of Aspects 29-33, wherein the CSI reporting granularity indication implicitly specifies the channel estimation granularity indication.

Aspect 35: The method of any one of Aspects 30-34, further comprising: generating the CSI based at least in part on the CSI reporting granularity indication and the channel estimation granularity indication.

Aspect 36: The method of Aspect 35, wherein the CSI reporting granularity indication specifies the downlink sub-band reporting granularity, wherein the channel estimation granularity indication specifies a wideband channel estimation granularity, wherein CSI reference signal (CSI-RS) resource information indicates a CSI resource associated with at least two downlink sub-bands, and wherein generating the CSI comprises: generating the CSI based at least in part on using the wideband channel estimation granularity.

Aspect 37: The method of Aspect 36, wherein generating the CSI further comprises: refraining from generating the CSI based at least in part on an uplink band associated with the full-duplex configuration.

Aspect 38: The method of Aspect 36, wherein generating the CSI further comprises: refraining from generating the CSI based at least in part on a guard band associated with the full-duplex configuration.

Aspect 39: The method of Aspect 35, wherein the CSI reporting granularity indication specifies the downlink sub-band reporting granularity, wherein the channel estimation granularity indication specifies a downlink sub-band channel estimation granularity, wherein CSI reference signal (CSI-RS) resource information indicates a CSI resource associated with at least two downlink sub-bands, and wherein generating the CSI comprises: generating the CSI based at least in part on dividing the CSI resource associated with the at least two downlink sub-bands into at least two reporting sub-bands.

Aspect 40: The method of Aspect 39, wherein generating the CSI based at least in part on dividing the CSI resource comprises: reporting a first CSI based at least in part on a first portion of the CSI resource associated with a first downlink sub-band of the at least two downlink sub-bands; and reporting a second CSI based at least in part on a second portion of the CSI resource associated with a second downlink sub-band of the at least two downlink sub-bands.

Aspect 41: The method of Aspect 40, wherein generating the CSI based at least in part on dividing the CSI resource further comprises: refraining from generating CSI for more than 19 portions of the CSI resource.

Aspect 42: The method of Aspect 35, wherein the CSI reporting granularity indication specifies the downlink sub-band reporting granularity, wherein the channel estimation granularity indication specifies a downlink sub-band channel estimation granularity, wherein CSI reference signal (CSI-RS) resource information indicates a CSI resource associated with at least two downlink sub-bands, and wherein generating the CSI comprises: generating a single CSI based at least in part on a first portion of the CSI resource associated with a first downlink sub-band of the at least two downlink sub-bands and a second portion of the CSI resource associated with a second downlink sub-band of the at least two downlink sub-bands.

Aspect 43: The method of Aspect 42, further comprising: deriving one or more common CSI parameters, and wherein generating the single CSI is based at least in part on the one or more common CSI parameters. wherein generating the single CSI is based at least in part on the one or more common CSI parameters.

Aspect 44: The method of Aspect 43, wherein deriving the one or more common CSI parameters is based at least in part on a UE-specific derivation algorithm.

Aspect 45: The method of Aspect 43, wherein deriving the one or more common CSI parameters is based at least in part on a standards-defined derivation algorithm.

Aspect 46: An apparatus for wireless communication at a device, comprising a processor; memory coupled with the processor; and instructions stored in the memory and executable by the processor to cause the apparatus to perform the method of one or more of Aspects 1-17.

Aspect 47: An apparatus for wireless communication at a device, comprising a processor; memory coupled with the processor; and instructions stored in the memory and executable by the processor to cause the apparatus to perform the method of one or more of Aspects 18-45.

Aspect 48: A device for wireless communication, comprising a memory and one or more processors coupled to the memory, the one or more processors configured to perform the method of one or more of Aspects 1-17.

Aspect 49: A device for wireless communication, comprising a memory and one or more processors coupled to the memory, the one or more processors configured to perform the method of one or more of Aspects 18-45.

Aspect 50: An apparatus for wireless communication, comprising at least one means for performing the method of one or more of Aspects 1-17.

Aspect 51: An apparatus for wireless communication, comprising at least one means for performing the method of one or more of Aspects 18-45.

Aspect 52: A non-transitory computer-readable medium storing code for wireless communication, the code comprising instructions executable by a processor to perform the method of one or more of Aspects 1-17.

Aspect 53: A non-transitory computer-readable medium storing code for wireless communication, the code comprising instructions executable by a processor to perform the method of one or more of Aspects 18-45.

Aspect 54: A non-transitory computer-readable medium storing a set of instructions for wireless communication, the set of instructions comprising one or more instructions that, when executed by one or more processors of a device, cause the device to perform the method of one or more of Aspects 1-17.

Aspect 55: A non-transitory computer-readable medium storing a set of instructions for wireless communication, the set of instructions comprising one or more instructions that, when executed by one or more processors of a device, cause the device to perform the method of one or more of Aspects 18-45.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a network node, comprising:
    one or more memories; and
    one or more processors, coupled to the one or more memories, configured to:
        transmit a channel estimation granularity indication that specifies a channel estimation granularity associated with generating channel state information (CSI) that is based at least in part on a full-duplex configuration, wherein the channel estimation granularity denotes a bandwidth size associated with a channel state information reference signal (CSI-RS) that utilizes constant precoding; and
        receive the CSI, the CSI associated with the channel estimation granularity indication.

2. The apparatus of claim 1, wherein the channel estimation granularity indication specifies:
    a per downlink sub-band channel estimation granularity.

3. The apparatus of claim 1, wherein the one or more processors, to transmit the channel estimation granularity indication, are configured to:
    transmit the channel estimation granularity indication in CSI-RS resource configuration information.

4. The apparatus of claim 3, wherein the CSI-RS resource configuration information specifies at least two downlink sub-band resources, and
    wherein the CSI-RS resource configuration information indicates, as at least part of the channel estimation granularity indication, a respective channel estimation granularity for each downlink sub-band resource of the at least two downlink sub-band resources.

5. The apparatus of claim 1, wherein the one or more processors are further configured to:
    transmit a preferred physical resource block (PRB) indication associated with generating the CSI.

6. The apparatus of claim 1, wherein the one or more processors are further configured to:
    transmit a CSI reporting granularity indication that is associated with generating the CSI.

7. The apparatus of claim 6, wherein the CSI reporting granularity indication specifies both a wideband CSI reporting granularity and a downlink sub-band reporting granularity, wherein the wideband CSI reporting granularity is based at least in part on a first periodicity, wherein the downlink sub-band reporting granularity is based at least in part on a second periodicity, and
    wherein the first periodicity is different from the second periodicity.

8. The apparatus of claim 6, wherein the channel estimation granularity indication is based at least in part on the CSI reporting granularity indication.

9. An apparatus for wireless communication at a user equipment (UE), comprising:
    one or more memories; and
    one or more processors, coupled to the one or more memories, configured to:
        receive a channel estimation granularity indication that specifies a channel estimation granularity associated with generating channel state information (CSI) that is based at least in part on a full-duplex configuration, wherein the channel estimation granularity denotes a bandwidth size associated with a channel state information reference signal (CSI-RS) that utilizes constant precoding; and
        transmit the CSI, the CSI based at least in part on the channel estimation granularity indication.

10. The apparatus of claim 9, wherein the channel estimation granularity indication specifies:
    a per downlink sub-band channel estimation granularity.

11. The apparatus of claim 9, wherein the one or more processors, to receive the channel estimation granularity indication, are configured to:
    receive the channel estimation granularity indication in CSI-RS resource configuration information.

12. The apparatus of claim 11, wherein the CSI-RS resource configuration information specifies at least two downlink sub-band resources, and
    wherein the CSI-RS resource configuration information indicates, as at least part of the channel estimation granularity indication, a respective channel estimation granularity for each downlink sub-band resource of the at least two downlink sub-band resources.

13. The apparatus of claim 9, wherein the one or more processors are further configured to:
    receive a CSI reporting granularity indication that is associated with generating the CSI.

14. The apparatus of claim 13, wherein the CSI reporting granularity indication specifies both a wideband CSI reporting granularity and a downlink sub-band reporting granularity, wherein the wideband CSI reporting granularity is based at least in part on a first periodicity, wherein the downlink sub-band reporting granularity is based at least in part on a second periodicity, and
    wherein the first periodicity is different from the second periodicity.

15. The apparatus of claim 13, wherein the CSI reporting granularity indication implicitly specifies the channel estimation granularity indication.

16. The apparatus of claim 13, wherein the CSI reporting granularity indication specifies a downlink sub-band reporting granularity, wherein the channel estimation granularity indication specifies a wideband channel estimation granularity, wherein CSI-RS resource information indicates a CSI resource associated with at least two downlink sub-bands, and
    wherein the one or more processors, to generate the CSI, are configured to:
        generate the CSI based at least in part on using the wideband channel estimation granularity.

17. The apparatus of claim 13, wherein the CSI reporting granularity indication specifies a downlink sub-band reporting granularity, wherein the channel estimation granularity indication specifies a downlink sub-band channel estimation granularity, wherein CSI-RS resource information indicates a CSI resource associated with at least two downlink sub-bands, and
    wherein the one or more processors, to generate the CSI, are configured to:
        generate the CSI based at least in part on dividing the CSI resource associated with the at least two downlink sub-bands into at least two reporting sub-bands.

18. The apparatus of claim 17, wherein the one or more processors, to generate the CSI based at least in part on dividing the CSI resource, are configured to:
    report a first CSI based at least in part on a first portion of the CSI resource associated with a first downlink sub-band of the at least two downlink sub-bands; and
    report a second CSI based at least in part on a second portion of the CSI resource associated with a second downlink sub-band of the at least two downlink sub-bands.

19. The apparatus of claim 13, wherein the CSI reporting granularity indication specifies a downlink sub-band reporting granularity, wherein the channel estimation granularity indication specifies a downlink sub-band channel estimation granularity, wherein CSI-RS resource information indicates a CSI resource associated with at least two downlink sub-bands, and
    wherein the one or more processors, to generate the CSI, are configured to:
        generate a single CSI based at least in part on a first portion of the CSI resource associated with a first downlink sub-band of the at least two downlink sub-bands and a second portion of the CSI resource associated with a second downlink sub-band of the at least two downlink sub-bands.

20. The apparatus of claim 19, wherein the one or more processors are further configured to:
    derive one or more common CSI parameters, and
    wherein generating the single CSI is based at least in part on the one or more common CSI parameters.

21. A method of wireless communication performed by a network node, comprising:
    transmitting a channel estimation granularity indication that specifies a channel estimation granularity associated with generating channel state information (CSI) that is based at least in part on a full-duplex configuration, wherein the channel estimation granularity denotes a bandwidth size associated with a channel state information reference signal (CSI-RS) that utilizes constant precoding; and
    receiving the CSI, the CSI associated with the channel estimation granularity indication.

22. The method of claim 21, wherein transmitting the channel estimation granularity indication comprises:
    transmitting the channel estimation granularity indication in CSI-RS resource configuration information.

23. The method of claim 22, wherein the CSI-RS resource configuration information specifies at least two downlink sub-band resources, and
    wherein the CSI-RS resource configuration information indicates, as at least part of the channel estimation granularity indication, a respective channel estimation granularity for each downlink sub-band resource of the at least two downlink sub-band resources.

24. The method of claim 21, wherein the channel estimation granularity indication specifies to determine the channel estimation granularity based at least in part on a slot type.

25. The method of claim 24, wherein the channel estimation granularity indication is based at least in part on a bit field that indicates whether to activate or deactivate determining the channel estimation granularity based at least in part on the slot type.

26. A method of wireless communication performed by a user equipment (UE), comprising:
- receiving a channel estimation granularity indication that specifies a channel estimation granularity associated with generating channel state information (CSI) that is based at least in part on a full-duplex configuration, wherein the channel estimation granularity denotes a bandwidth size associated with a channel state information reference signal (CSI-RS) that utilizes constant precoding; and
- transmitting the CSI, the CSI based at least in part on the channel estimation granularity indication.

27. The method of claim 26, wherein receiving the channel estimation granularity indication comprises:
- receiving the channel estimation granularity indication in CSI-RS resource configuration information.

28. The method of claim 27, wherein the CSI-RS resource configuration information specifies at least two downlink sub-band resources, and
- wherein the CSI-RS resource configuration information indicates, as at least part of the channel estimation granularity indication, a respective channel estimation granularity for each downlink sub-band resource of the at least two downlink sub-band resources.

29. The method of claim 26, further comprising:
- receiving a CSI reporting granularity indication that is associated with generating the CSI.

30. The method of claim 29, wherein the channel estimation granularity indication is based at least in part on the CSI reporting granularity indication.

* * * * *